(12) United States Patent
Zimmerman, III et al.

(10) Patent No.: US 11,917,728 B2
(45) Date of Patent: Feb. 27, 2024

(54) CAMOUFLAGED SMALL CELL NETWORKING DEVICES

(71) Applicant: Ubicquia, Inc., Fort Lauderdale, FL (US)

(72) Inventors: Ronald B. Zimmerman, III, Wellington, FL (US); Ian B. Aaron, Fort Lauderdale, FL (US)

(73) Assignee: Ubicquia, Inc., Fort Lauderdale, FL (US)

( * ) Notice: Subject to any disclaimer, the term of this patent is extended or adjusted under 35 U.S.C. 154(b) by 0 days.

(21) Appl. No.: 18/090,194

(22) Filed: Dec. 28, 2022

(65) Prior Publication Data

US 2023/0134853 A1    May 4, 2023

Related U.S. Application Data

(62) Division of application No. 16/960,519, filed as application No. PCT/US2019/012779 on Jan. 8, 2019.

(60) Provisional application No. 62/730,141, filed on Sep. 12, 2018, provisional application No. 62/614,918, filed on Jan. 8, 2018.

(51) Int. Cl.
*H04W 88/08*   (2009.01)
*B21D 51/52*   (2006.01)
*B23P 6/00*    (2006.01)

(52) U.S. Cl.
CPC ............ *H04W 88/08* (2013.01); *B21D 51/52* (2013.01); *B23P 6/00* (2013.01)

(58) Field of Classification Search
CPC ........ H04W 88/08; H04W 16/26; H01Q 1/44; H01Q 1/246; H01Q 1/1207; B21D 51/52; B23P 6/00
See application file for complete search history.

(56) References Cited

U.S. PATENT DOCUMENTS

| 6,330,153 B1 * | 12/2001 | Ketonen | ............ | H05K 7/20145 |
| | | | | 361/689 |
| 2011/0188256 A1 | 8/2011 | Tu et al. | | |
| 2012/0327641 A1 | 12/2012 | Holder et al. | | |

(Continued)

OTHER PUBLICATIONS

Wei et al., A New Adaptive Small-Cell Architecture, May 2013, IEEE, vol. 31, No. 5 (Year: 2013).*

(Continued)

*Primary Examiner* — Raymond S Dean
(74) *Attorney, Agent, or Firm* — Daniel C. Crilly

(57) ABSTRACT

A small cell device includes a housing body, a heat sink, an interface board, a first power amplifier (PA) board, a second PA board, a power board, and a main board. The housing body defines a cavity and has two depthwise ends. The heat sink is coupled to the housing proximate a first depthwise end. The interface board is positioned within the cavity and adjacent to the heat sink. The first PA board is positioned within the cavity and adjacent to the interface board and the heat sink. The second PA board is positioned within the cavity and proximate a second depthwise end. The power board is positioned within the cavity and adjacent to the second PA board. The main board is positioned within the cavity between the interface board and the second PA board. The heat sink dissipates heat generated during operation of at least the first PA board.

12 Claims, 30 Drawing Sheets

(56) References Cited

U.S. PATENT DOCUMENTS

| | | | |
|---|---|---|---|
| 2015/0156818 A1 | 6/2015 | Kim et al. | |
| 2015/0349399 A1 | 12/2015 | Lasier et al. | |
| 2015/0373556 A1 | 12/2015 | Oren-Pines et al. | |
| 2016/0099749 A1 | 4/2016 | Bennett et al. | |
| 2016/0126629 A1 | 5/2016 | Cherrette et al. | |
| 2016/0135175 A1* | 5/2016 | Tarlazzi | H04W 28/08 370/329 |
| 2016/0192441 A1 | 6/2016 | Nakazawa et al. | |
| 2016/0261030 A1 | 9/2016 | Kim et al. | |
| 2017/0324154 A1* | 11/2017 | Hendrix | H01Q 1/42 |
| 2018/0027359 A1 | 1/2018 | Gonzalez et al. | |
| 2018/0045388 A1 | 2/2018 | McDowell et al. | |
| 2018/0054817 A1* | 2/2018 | Jabara | H04W 88/085 |
| 2018/0252400 A1* | 9/2018 | Goerts | H01R 13/58 |
| 2018/0309625 A1 | 10/2018 | Adriazola et al. | |
| 2019/0020383 A1* | 1/2019 | Chritz | H04B 7/04 |
| 2019/0075516 A1* | 3/2019 | Lotter | H04W 84/047 |

OTHER PUBLICATIONS

United States Patent & Trademark Office as International Searching Authority, International Search Report issued in connection with counterpart International Application No. PCT/US2019/012779, dated Apr. 26, 2019, 4 pages.

European Patent Office, Supplementary European Search Report in connection with European Application No. 1973625.0, dated Oct. 20, 2021, 8 pages.

* cited by examiner

CAMOUFLAGED SMALL CELL NETWORKING DEVICES

CROSS-REFERENCE TO RELATED APPLICATIONS

The present application is a division of U.S. application Ser. No. 16/960,519, which was filed on Jul. 7, 2020, and is incorporated herein by reference in its entirety. application Ser. No. 16/960,519 is U.S. national stage of International Application No. PCT/US2019/012779, which was filed on Jan. 8, 2019, and is incorporated herein by reference in its entirety. International Application No. PCT/US2019/012779 claims priority upon and the benefit of U.S. Provisional Application No. 62/730,141, which was filed on Sep. 12, 2018, and is incorporated herein by reference in its entirety. International Application No. PCT/US2019/012779 also claims priority upon and the benefit of U.S. Provisional Application No. 62/614,918, which was filed on Jan. 8, 2018, and is incorporated herein by reference in its entirety

BACKGROUND

Technical Field

The present disclosure generally relates to devices having cellular network capabilities. More particularly, but not exclusively, the present disclosure relates to small cell networking devices having a desired shape and electromechanical configuration for mounting to, or integration into, one or more objects commonly found in a city so as to camouflage the small cells in an aesthetically pleasing manner.

Description of the Related Art

A mobile network operator (MNO) is an entity that operates a cellular communications system. Mobile network operators may be private entities, public entities, entities owned and controlled by a government, public-private partnership entities or other entities. A mobile network operator may be a for-profit entity, a non-profit entity, or an entity having some other financial model.

As the term is used in the present disclosure, an MNO may also be referred to as a wireless carrier, a cell service provider, a wireless service provider, cellular company, and many other like terms. An MNO typically provides cellular-based wireless communication services.

An MNO is different from a provider of other wireless services because the MNO owns or otherwise controls certain specific elements that are necessary to deliver wireless communication services to an end user. These necessary specific elements that set apart an MNO from providers of other wireless service include radio spectrum allocation (i.e., one or more radio spectrum licenses from a regulatory or government entity), wireless network infrastructure, and back haul infrastructure. These infrastructure elements enable the MNO to provide wireless voice, data, or voice and data services to subscribers using frequencies that are allocated as part of the licensed radio spectrum. In addition, though not required, an MNO will generally also have an available infrastructure to charge and collect money for use of its wireless services, a customer service infrastructure, repair personnel and facilities, and the ability to provision computing devices (e.g., cell phones, smart phones, tablets, global positioning service (GPS) devices, vehicle-based devices, and the like) for permissive use of its wireless network services.

In some cases, MNOs or other entities provide non-cellular wireless services such as "Wi-Fi" services. Wi-Fi services are known to pass communications according to a communications standard administered by the Institute of Electrical and Electronic Engineers (IEEE). One such standard is referred to as IEEE 802.11. These non-cellular wireless communication services may be available to the public for free or for a cost. These non-cellular wireless communication services may be available in restaurants, airports, airplanes, public buildings, and the like. Even when these Wi-Fi services are provided by an MNO, these Wi-Fi services are not considered "MNO services" or "cellular-based" services because they are delivered to end user devices using non-cellular frequencies and protocols. What's more, even if some portion of Wi-Fi delivered data is passed over a cellular-based network (e.g., infrastructure downstream of a Wi-Fi access point couples communications to or through a cellular-based network), these services are still not considered MNO services, cellular-based services, or carrier services because the interface to the end-user device is enabled via Wi-Fi services and not by cellular-based services.

In some cases, an MNO operates and offers access to its own branded cellular-based infrastructure. In other cases, an MNO provides access to its cellular-based infrastructure to other entities that provide services under a different brand. These other entities may be known as "downstream" or "virtual" carriers or by other such titles and phrases. The term MNO in the present disclosure includes actual mobile network operators, virtual network operators, and other such entities when the underlying wireless services are provided to an end user via the necessary specific elements that set apart an MNO from other providers of wireless service.

For example, some known MNOs of the Americas include AT&T, BELL, CLARO, ENTEL, MOVILNET, MOVISTAR, ROGERS, SPRINT, T-MOBILE, TELCEL, TELUS, TIM, VERIZON, and VIVO. Some European MNOs include EE, MEGAFON, MTS, O2, ORANGE, and VODAFONE. Some Asia-Pacific MNOs include AIRTEL, AIS, BSNL, CHINA MOBILE, CHINA TELECOM, CHINA UNICOM, DEA CELLULAR, JIO, KT, NTT DOCOMO, SK TELECOM, SOFTBANK CORP, TELSTRA, and VODAFONE.

In a cellular-based network, wireless communications to and from a user's mobile device occur at various frequencies and according to a protocol controlled by the MNO. The user's mobile device includes a wireless transceiver arranged to communicate according to the MNO controlled frequency and protocol. During communications, the user's wireless transceiver is communicatively coupled to a wireless transceiver commissioned by the MNO. The data sent and received between the two wireless transceivers may include voice communications, short message service (SMS) messages, electronic mail, internet traffic, and any other such data.

The large area over which an MNO's cellular-based network operates is divided into areas called macrocells, which may be abbreviated simply to "cells." Many adjacent macrocells are formed to provide wireless cellular-based network coverage over a wide geographic area. Each macrocell may be served by one or more MNO commissioned transceivers. Typically, however, each macrocell is served by three macrocell sites, which may also be referred to as base stations, base transceivers, cell towers, cell stations, or the like. Neighboring macrocells are generally arranged to use different frequencies, phases, or other distributive characteristics of the MNOs licensed frequency spectrum to reduce or avoid interference between macrocells. The macrocells and the mobile computing devices provisioned by the MNO to operate on its network are arranged to cooperate communicatively such that a mobile device may continue seamless communications as the mobile device moves from one macrocell to another.

In some cases, geographic areas within a macrocell are challenged by geographic features, population density, or other factors where an MNO decides additional cellular coverage is necessary. For example, in densely populated urban areas or cities, an MNO may decide that coverage within the macrocell is lacking due to interference caused by tall buildings, or by simply a large number of concurrent users. The MNO may also determine that the smaller area is not desirably serviceable by a macrocell tower. In these cases, the MNO may deploy a "small cell" to provide wireless cellular-based network communication services. It is generally known that a "small cell" is a term of art in the cellular-based industry. A mobile device provisioned by the MNO communicates with a small cell in the same or similar manner that the mobile device communicates with a macrocell tower. In at least some cases, an active communication session formed between a small cell and a mobile device may be handed off to or from a small cell as the mobile device moves into or out from the active range of the small cell. For example, a user having an active communication session enabled by a small cell may be in motion, and when the mobile device is in motion, the active communication session may in some cases be automatically and seamlessly handed off and continue via another small cell or via a macrocell tower.

As is known, many different types of small cells are deployed by MNOs to serve particular geographic areas within a larger macrocell. Some of the different types of small cells are microcells, metrocells, picocells, and femtocells. Microcells generally cover an area having diameter less than about one mile and operate with a radiated power of about five watts (5 W) to ten watts (10 W). Metrocells generally cover an area having a diameter of less than about a half mile and operate with a radiated power of about 5 W or less. Metrocells can provide wireless cellular-based service for up to about 200 concurrent mobile devices. Picocells generally cover an area having a diameter less than about 500 feet and operate with a radiated power of about 100 milliwatts (mW) to 5 W; providing cellular-based wireless service for up to about 5 dozen concurrent mobile devices. Femtocells generally cover areas having a diameter less than about 30 feet and operate with a radiated power of about 10 mW to 1000 mW to provide cellular-based service for up to just a few mobile devices.

Small cells are usually owned, installed, and maintained by the MNO on whose network they will operate. Even in cases of femtocells, which may be installed by a non-MNO entity, the femtocells are deployed and provisioned by the MNO for operation on the MNO's wireless cellular-based network. This provisioning is necessary in a small cell because the small cell operates in the MNO's licensed frequency spectrum. In addition to having a front end with a cellular-based interface, the small cell has a back end that provides backhaul services for the device. Small cell backhaul is the transmission link between the small cell and the MNO's core network. In some small cells, backhaul services are provided across conventional broadband internet services such as digital subscriber line (DSL), cable, a Ti line, or some other wide area network access point.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

A system includes a permanently affixed object and a removable component coupled to the permanently fixed object. A small cell networking device is integrated into the removable component, wherein the small cell networking device includes at least one wireless transceiver module within the small cell networking device that is operable to provide wireless communication capability to a wireless network controlled by a mobile network operator. The system may further include the permanently affixed object comprising one of: a streetlight, a light pole, an LED board, a bracket, a street sign, a highway sign, a bus stop shelter, an ATM, a phone booth, a building, an HVAC unit, a mailbox, a billboard, a light, a parking sign, a stop light, a speed limit sign, a solar cell, a crosswalk sign, a tunnel, a utility box, a water tower, a crane, a radio antenna tower, a store, an awning, a roof, and a parking pay station.

In further embodiments, the system includes the removable component comprising a door, with the small cell networking device integrated into the door, wherein the door rotates relative to the permanently affixed object about a hinge. Further, the small cell networking device can include a plurality of electronic components, the plurality of electronic components including one or more of: an antenna, an identity module, a GPS module, a security module, a memory, a cellular parameter module, a cellular-based gateway, an input module, an output module, a wired transceiver module, and a light sensor module.

An alternative embodiment of a small cell device includes: a housing having a first portion opposite a second portion; a first heat sink coupled to the housing proximate the first portion; an interface board positioned within the housing below the heat sink; a first power amplifier board positioned within the housing adjacent to the interface board; a main board positioned within the housing below the interface board and the first power amplifier board; a power board positioned within the housing below the main board; and a second power amplifier board positioned within the housing adjacent to the power board wherein the device is arranged as a small cell networking device, and wherein said first heat sink is arranged to dissipate heat generated during operations of at least one wireless transceiver module adjacent to the power board.

The small cell device may further include: a second heat sink coupled to the housing proximate the second portion, wherein the second heat sink is below the power board and the second power amplifier board; an antenna board below the second heat sink; and an antenna cover coupled to the housing and enclosing the antenna board.

A method of concealing a small cell networking device includes removing an original component of an object; constructing a modified component to replace the original component of the object, the constructing including mounting the small cell networking device inside the modified component in a location that the small cell networking device is not physically visible to a user, the small cell networking device including at least one wireless transceiver module operable to provide wireless communication capability to a wireless network controlled by a mobile network operator; and installing the modified component in place of the original component in the object.

The method may further include installing the modified component in place of the original component in the object, the object comprising one of: a streetlight, a light pole, an LED board, a bracket, a street sign, a highway sign, a bus stop shelter, an ATM, a phone booth, a building, an HVAC unit, a mailbox, a billboard, a light, a parking sign, a stop light, a speed limit sign, a solar cell, a crosswalk sign, a tunnel, a utility box, a water tower, a crane, a radio antenna tower, a store, an awning, a roof, and a parking pay station. Alternatively or additionally, the method includes incorporating into the modified component at least one or more of: an antenna, an identity module, a GPS module, a security module, a memory, a cellular parameter module, a cellular-based gateway, an input module, an output module, a wired transceiver module, and a light sensor module.

This Brief Summary has been provided to introduce certain concepts in a simplified form that are further described in detail below in the Detailed Description. Except where otherwise expressly stated, the Brief Summary does not identify key or essential features of the claimed subject matter, nor is it intended to limit the scope of the claimed subject matter.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
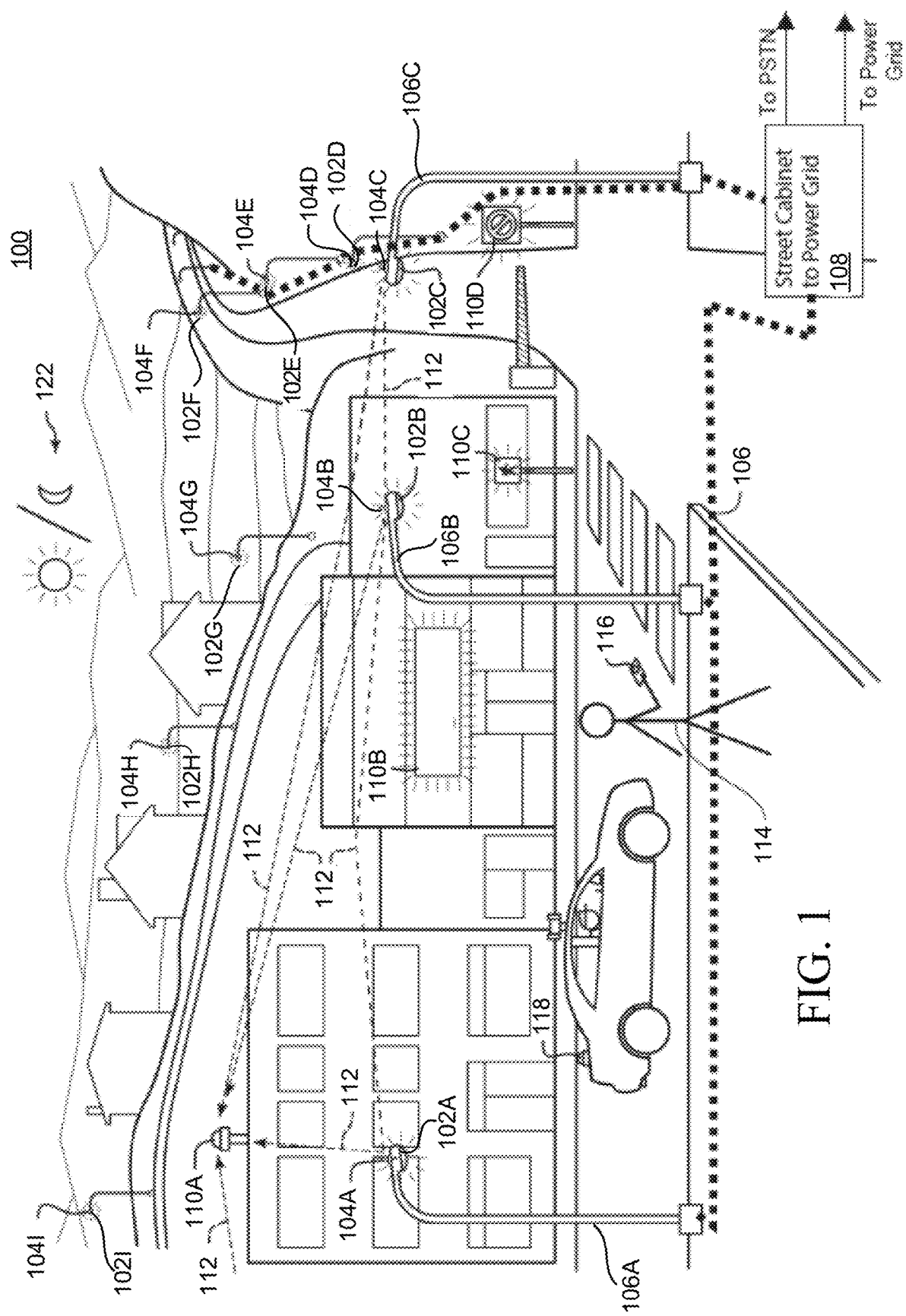
FIG. 1 is a system level deployment of small cells mounted to a variety of objects within an urban landscape according to principles of the disclosure as taught herein.

The present disclosure may be understood more readily by reference to this detailed description of the invention. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring descriptions of the embodiments.

Small cells may include multiple antennas that transmit signals to and receive signals from user devices. If a small cell has a small physical footprint, the antennas of the small cell are likely located close to one another. RF co-site interference may occur when two or more co-located RF systems have a negative impact on each other. For example, operation of a transmitter of the small call may negatively impact one or more receivers of the small cell. The degree to which such a transmitter negatively impacts the receivers depends on a number of factors, including the distance between transmitting and receiving antennas, the magnitude of the power level of transmitted signals, and frequencies of transmitted and received signals, for example.

However, a common issue with small cells in use today is their unsightly appearance. In other words, embodiments of current small cells tend to be bulky and awkward in appearance. Thus, MNOs face resistance from installing such small cells on government owned property, such as streetlights, utility poles, stop lights, or other devices commonly located in cities. Further, due to the relatively limited range of small cells relative to macrocells, such devices are desirably integrated into a large number of objects within a city so to provide overlapping coverage enabling small cells to hand off users as they move about an urban area. This desirable high density of devices further exacerbates the aesthetic challenges associated with current small cells.

Moreover, the introduction and advancement of advanced cellular technologies and protocols such as 4G LTE Advanced and 5G have produced a need for additional small cell support. In particular, such technologies utilize high frequency (i.e., between 25 GHz and 300 GHz) millimeter waves to increase wireless capacity and speeds. The downside to such waves is limited signal penetration and range. For example, a 28 GHz millimeter wave may only have a maximum theoretical range between 1,000 and 1,500 feet. In a densely populated urban area, then, a large number of small cells are needed in order to support the limited range of such technological advances. Thus, there remains a need in the art for providing small cells that can be "camouflaged" into common urban objects by mounting to, or otherwise integrating into, such objects in an aesthetically pleasing manner in order to provide an expanded network of interconnected devices to support existing and new wireless protocols.

Embodiments of the present disclosure include small cell devices that have a desired shape and electromechanical configuration for mounting to various urban objects. In an embodiment, each small cell device includes an interface connector that is compliant with a particular standard, such as a Roadway and Area Lighting Equipment standard ANSI C136.41, which is promulgated by the American National Standards Institute (ANSI) and the National Electrical Manufacturers Association (NEMA). Such an interface connector may be referred to as a NEMA-style connector. The NEMA-style connector enables the small cell device to be electromechanically coupled to a streetlight fixture, generally on the top of the streetlight fixture. In this way, the small cell device is attached to or otherwise integrated into the streetlight fixture and can pass information between the small cell device and the streetlight fixture. The information may include any one or more of high speed data, low speed data, power, digital signals, analog signals, differential signals, or other types of information. In various embodiments, small cell devices may include or be referred to as aerial control fixtures, small cell networking devices, streetlight-fixture controller, aerial small cell devices, or the like.

FIG. 1 is an exemplary embodiment of a system level deployment 100 of small cell devices 104A-104I coupled to streetlight fixtures 102A-102I according to principles of the disclosure as taught herein. The streetlight fixtures 102A-102I are coupled to or otherwise arranged as part of a system of streetlight poles, and each streetlight fixture includes a light source. Each light source, light fixture, and light fitting, individually or along with their related components, may in some cases be interchangeably referred to as a luminaire, a light source, a streetlight, a streetlamp, or some other such suitable term. Those of ordinary skill in the art will understand that a small cell device 104 as described herein does not need to be directly coupled to a streetlight fixture 102 and instead such small cell device 104 can be coupled to buildings, towers, masts, signage, or any other structure, as described herein. Nevertheless, for simplicity in the description with respect to this embodiment, small cell devices 104A-104I described herein are coupled to streetlight fixtures 102A-102I.

Briefly, each small cell device 104 monitors one or more sensors or conditions associated with the corresponding streetlight fixture 102 for events. Examples of events can include, but are not limited to, light source failure (e.g., a burned out bulb), light pole tilt, external vibrations, light source temperature, external temperature, power usage, images, sound recordings, network traffic, network throughput, cellular signal strength, or other information that can be obtained or recorded by the small cell device 104.

In general, each small cell device 104A-104I receives a same distributed clock, such as via a GPS signal. Each small cell device 104 sets or otherwise calibrates its local clock from the distributed clock. In this way, each local clock of the small cell devices 104A-104I is synchronized to the distributed clock. When event data is monitored and captured by a small cell device 104, the small cell device 104 stores the monitored event data in a local, non-volatile ring buffer that can be accessed by the respective small cell device. The stored event data is correlated to the distributed clock that is common to each of the small cell devices 104A-104I.

The small cell devices 104A-104I may periodically or at selected times send the stored correlated event data to a remote server (not illustrated). In various embodiments, however, small cell devices 104A-104I provide the stored event data to the remote server in response to a request from the remote server or in response to a selected incident (e.g., sensor data exceeds a selected threshold value), such as when network traffic exceeds a particular threshold value.

As shown in the system level deployment 100, a plurality of light poles 106 are arranged in one or more determined geographic areas, such as a city or town, neighborhood, street, county, municipality, city block, etc. Each light pole 106 has at least one streetlight fixture 102 affixed thereto. For example, streetlight fixture 102A is coupled to light pole 106A, streetlight fixture 102B is coupled to light pole 106B, streetlight fixture 102C is coupled to light pole 106C, and so on. In most cases, the streetlight fixture 102 is at least twenty feet above ground level and in at least some cases, the streetlight fixtures 102A-102I are between about 20 feet and 40 feet above ground level. In other cases, the streetlight fixtures 102 may of course be lower than 20 feet above the ground or higher than 40 feet above the ground. Although described as being above the ground, streetlight fixtures 102A-102I may also be subterranean, but positioned above the floor, such as in a tunnel.

The system of streetlight poles, streetlight fixtures, streetlight sources, or the like in the system level deployment may be controlled by a municipality or other government agency. In other cases, the system streetlight poles, streetlight fixtures, streetlight sources, or the like in the system level deployment is controlled by a private entity (e.g., private property owner, third-party service contractor, or the like). In still other cases, a plurality of entities may share control of the system of streetlight poles, streetlight fixtures, streetlight sources, or the like. The shared control may be hierarchical or cooperative in some other fashion. For example, when the system is controlled by a municipality or a department of transportation, an emergency services agency (e.g., law enforcement, medical services, fire services) may be able to request or otherwise take control of the system. In still other cases, one or more sub-parts of the system of streetlight poles, streetlight fixtures, streetlight sources, or the like can be granted some control such as in a neighborhood, around a hospital or fire department, in a construction area, or in some other manner.

In the system level deployment 100 of FIG. 1, any number of streetlight fixtures 102 may be arranged with a small cell device 104. In various embodiments, each small cell device 104 includes at least one connector portion that is compliant with a roadway area lighting standard promoted by a standards body, such as a multi-pin NEMA connector that is compliant with an ANSI C136.41, which allows for uniform connectivity to the streetlight fixture 102. The controlling or servicing authority of the system can install the small cell devices 104A-104I on each streetlight fixture 102A-102I, or the small cell device 104 may be built into or embedded in each streetlight fixture 102. The use of small cell devices 104A-104I allows for the controlling or servicing authority to control the streetlight fixtures 102A-102I, collect information on the streetlight fixtures 102A-102I, or provide other wireless services to the public.

In the system level deployment 100, a small cell device 104 is electromechanically coupled to a selected light pole wherein the electromechanical coupling is performed via the connector that is compliant with the roadway area lighting standard promoted by a standards body. In the illustrated example, small cell devices 104A-104I are coupled to streetlight fixtures 102A-102I, respectively. In this way, each separate small cell device 104A-104I controls or monitors a respective streetlight fixture 102A-102I.

In some embodiments, the small cell device 104 includes a processor-based light control circuit and a light sensor such that it provides a light control signal to the light source of the respective streetlight fixture 102 based on at least one ambient light signal generated by its associated the light sensor.

In other embodiments, each small cell device 104A-104I may be equipped with communication capabilities, which allows for the remote control of light source of the streetlight fixture 102A-102I. Accordingly, each light source in each streetlight fixture 102A-102I can be controlled remotely as an independent light source or in combination with other light sources, which also for the wireless communication of light control signals and any other information (e.g., packetized data) between small cell devices 104A-104I.

This communication capability may also be used for additional communications between small cell devices 104A-104I, other computing devices 110A-110D, or a remote server. Accordingly, each of the plurality of streetlight fixtures 102A-102I that has a corresponding small cell device 104 may be communicatively coupled to one another and to other computing devices. Each small cell device 104 may be in direct or indirect wireless communication with one another, such as via wireless communication links 112.

In some embodiments, the small cell devices 104A-104I may communicate with a remote server. In other embodiments, one or more of the small cell devices 104A-104I may communicate with other computing devices 110A-110D. The other computing devices 110A-110D may be controlled by a mobile network operator (MNO), a municipality, another government agency, a third party, or some other entity. In at least one embodiment, one or more of the other computing devices 110A-110D be internet of things (IoT) devices or some other types of devices. For example, in this illustration, two public information signs 110B, 110C, and a private entity sign 110D are shown, but many other types of devices are contemplated. Each one of these devices may form an unlicensed wireless communication session (e.g., Wi-Fi) or a cellular-based wireless communication session with one or more wireless networks made available by the small cell devices 104A-104I in the system level deployment 100 of FIG. 1.

As one non-limiting, non-exhaustive example, each small cell device 104 may operate a small cell networking device to provide wireless cellular-based network communication services. A mobile device, e.g., mobile device 116, provisioned by the MNO communicates with a small cell in the same or similar manner that the mobile device communicates with a macrocell tower. In at least some cases, an active communication session formed between a small cell and a mobile device may be handed off to or from a small cell as the mobile device moves into or out from the active range of the small cell. For example, a user having an active communication session enabled by a small cell may be in motion, and when the mobile device is in motion, the active communication session may in some cases be automatically and seamlessly handed off and continue via another small cell or via a macrocell tower.

In the system level deployment 100 of FIG. 1, various ones of the light poles 106 may be 50 feet apart, 100 feet apart, 250 feet apart, or some other distance. In some cases, the type and performance characteristics of each small cell device 104 are selected based on their respective distance to other such devices such that wireless communications are acceptable.

Small cell devices 104 A-104I may be coupled to a street cabinet 108 or other like structure that provides utility power (e.g., "the power grid") in a wired way via the coupled streetlight fixture 102 and light pole 106. The utility power may provide 120 VAC, 240 VAC, 260 VAC, or some other power source voltage, which is used to power both the light source of the streetlight fixture 102 and the coupled small cell device 104. In addition, small cell devices 104 A-104I may also be coupled to the same street cabinet 108 or another structure via a wired backhaul connection via the coupled streetlight fixture 102 and light pole 106. It is understood that these wired connections are in some cases separate wired connections (e.g., copper wire, fiber optic cable, industrial Ethernet cable, or the like) and in some cases combined wired connections (e.g., power over Ethernet (PoE), powerline communications, or the like). For simplification of the system level deployment 100 of FIG. 1, the wired backhaul and power line 106 is illustrated as a single line. The street cabinet 108 is coupled to the power grid, which is administered by a licensed power utility agency, and the street cabinet 108 is coupled to the public switched telephone network (PSTN).

As mentioned above, a small cell device 104 may operate as a small cell networking device. A user 114 holding a mobile device 116 is represented in the system level deployment 100 of FIG. 1. A vehicle having an in-vehicle mobile device 118 is also represented. The vehicle may be an emergency service vehicle, a passenger vehicle, a commercial vehicle, a public transportation vehicle, a drone, or some other type of vehicle. The user 114 may use their mobile device 116 to establish a wireless communication session over a cellular-based network controlled by an MNO, wherein packetized wireless data is passed through the small cell device 104 to the MNO via cellular macrocell tower. Concurrently, the in-vehicle mobile device 118 may also establish a wireless communication session over the same or a different cellular-based network controlled by the same or a different MNO, wherein packetized wireless data of the second session is also passed through the small cell device 104 to the MNO via cellular macrocell tower.

The sun and moon 122 are shown in FIG. 1. In embodiments where the smart cell device 104 is configured to control the light source of a light pole, light or the absence of light based on time of day, weather, geography, or other causes provide information (e.g., ambient light) to the light sensors of the small cell device 104. Based on this information, the small cell device 104 provides control instructions or signals to the associated streetlight fixture, which controls its corresponding light source. Although FIG. 1 illustrates small cell devices 104A-104I, more or fewer small cell devices may be employed in embodiments described herein.

Figure 2A:
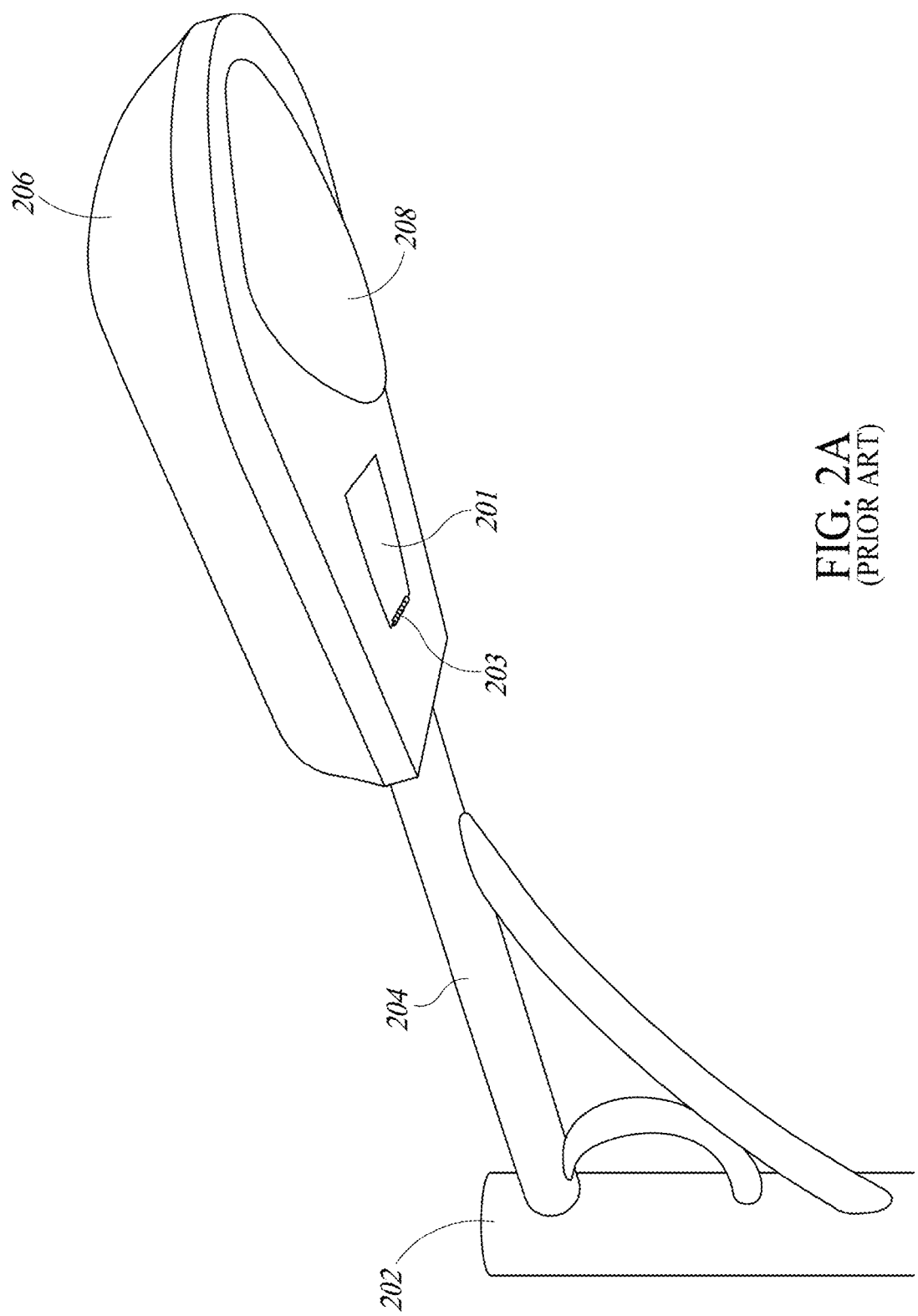
FIG. 2A is a perspective view of a prior art light fixture coupled to a light pole.

FIG. 2A illustrates a known light fixture 206 coupled to a light pole 202 via a support 204. The light fixture 206 includes a light source 208 as well as a door 201 coupled to the light fixture 206 via a hinge 203. The door 201 is rotatable about the hinge 203 to provide access to an interior of the light fixture 206 in order to perform maintenance on the light fixture 206. Further, the door 201 can be removed from the light fixture 206, such as, for example, to replace the door 201 with a modified component including a small cell networking device integrated into or incorporated into the modified component, wherein the modified component is installed in place of the original component (i.e. the door 201) on or in a permanently affixed object (i.e. light fixture 206, or the permanently affixed objects discussed with reference to FIGS. 4A-W, among others), as taught by principles of the present disclosure.

Figure 2B:
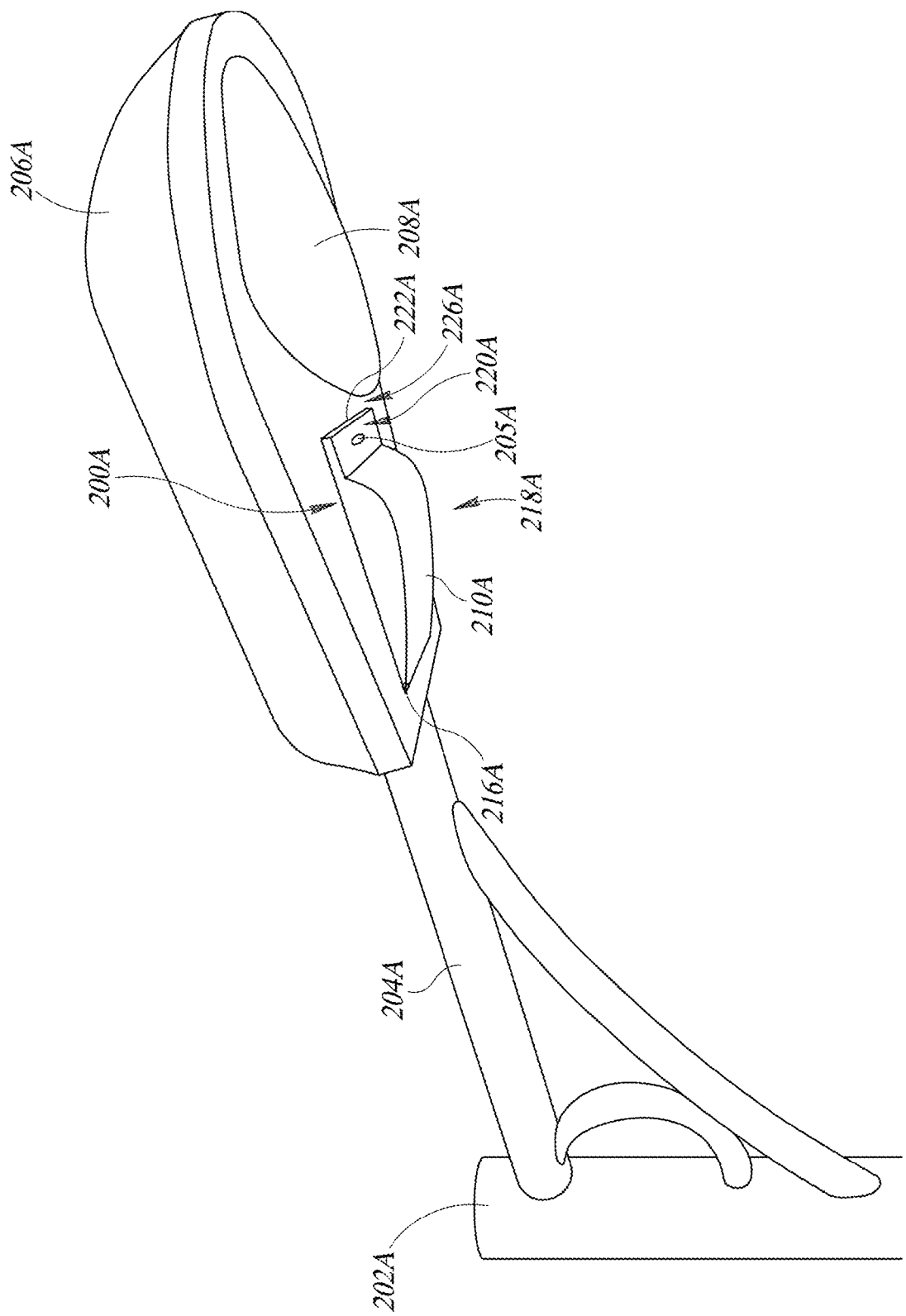
FIG. 2B is perspective view of an alternative exemplary embodiment of a small cell integrated into a modified component of a light fixture coupled to a light pole.

FIG. 2B illustrates an exemplary embodiment of a small cell networking device 200A integrated with a light fixture 206A, which itself is coupled to a light pole 202A by a support 204A. The light pole 202A and the support 204A may be formed of any number of materials, such as various metals (i.e. steel, aluminum, and their alloys) or wood, for example. The small cell device 200A of FIG. 2B is arranged as a networking device, but in other embodiments, the small cell device 200A includes smart sensor capability, as described above with reference to FIG. 1, such that the small cell device 200A is a combination device. In other words, in various embodiments, the small cell device 200A is a small cell networking device, a smart sensor device, a combination device, some other wireless networking device, or some other control device. The light fixture 206A includes a light source 208A. The light source 208A may be an incandescent light source, a light emitting diode (LED) light source, a high pressure sodium lamp, or any other type of light source.

In the light fixture 206A of FIG. 2B, the small cell device 200A comprises a modified component of the light fixture 206A. In other words, light fixtures 206A commonly include an original component, such as access door 201, shown in FIG. 2A that rotates between a closed position and an open position about a hinge 216A proximate where the light fixture 206A adjoins the support 204A. Of course, such door may also be positioned in other locations, such as on the top of the light fixture 206A. The door is used for maintenance or other activities, for example to replace a burned out light bulb, or to upgrade the light source from an incandescent source to an LED source. As such, the door can be removed and replaced with a modified component with the small cell device 200A integrated into the modified component, wherein the modified component (i.e., small cell device 200A) is installed in place of the original component in or on the object. As such, the small cell device 200A may also be referred to as a "door" or a "removable component" or a "modified component," as the small cell device 200A rotates about a hinge 216A to provide access to an interior of the light fixture 206A. In the embodiment of FIG. 2B, the small cell device 200A is rotatable about the hinge 216A in a similar manner to the original door, such that replacing the door with the small cell device 200A does not restrict access to the interior components of the light fixture 206A, such as the components associated with the light source 208A.

Figure 3A:
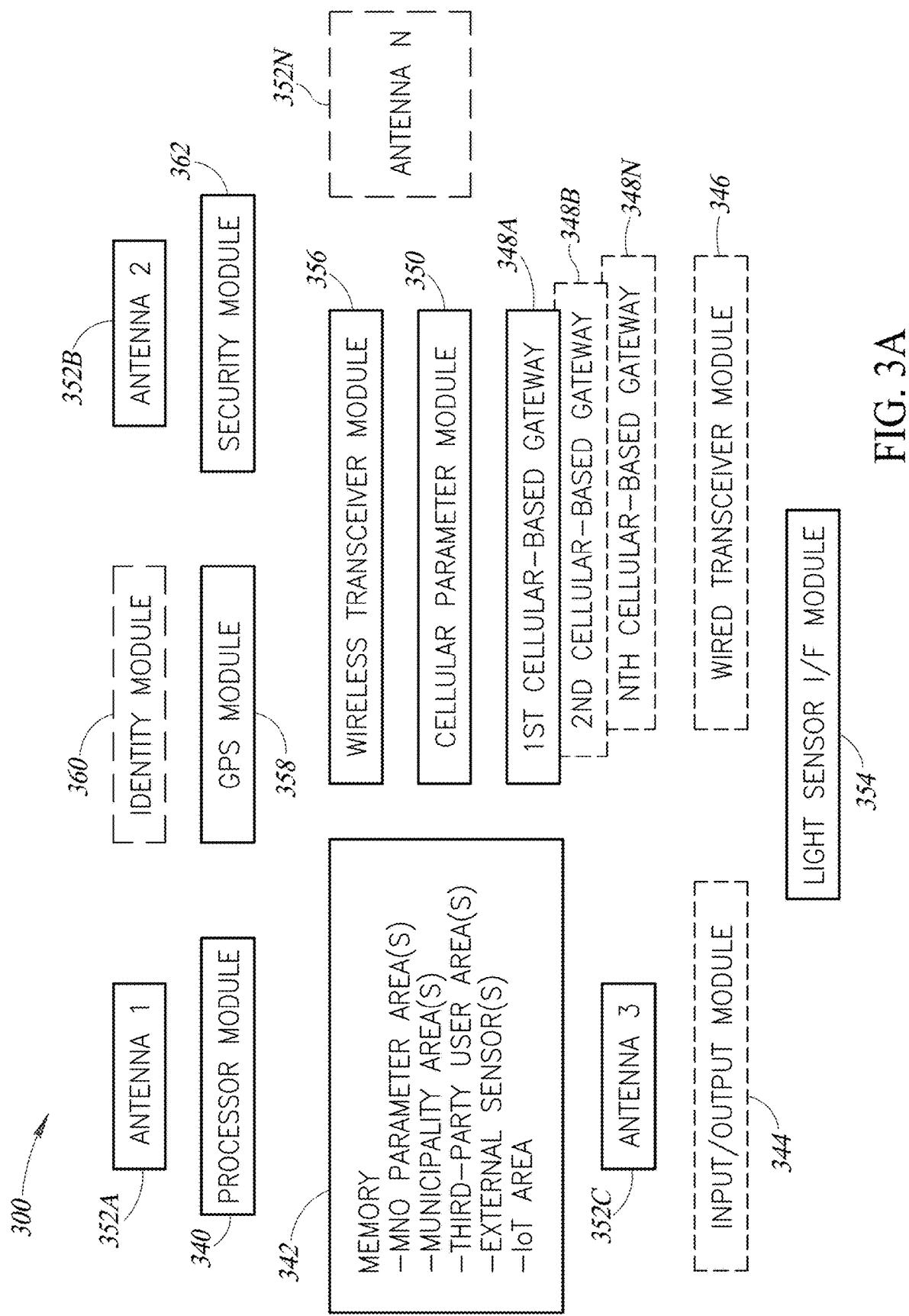
FIG. 3A is a block diagram embodiment of representative electronics included in an exemplary small cell.

As such, an embodiment of a method for concealing a small cell networking device includes removing an original component of object, such as door 201 of light fixture 206, and constructing a modified component to replace the original component. For example, the modified component can be the small cell device 200A or 200B described herein, wherein electronic components, such as electronic components 300 described with reference to FIG. 3A, are mounted inside the small cell device 200A so as to not be physically visible to a user. As described in additional detail below with reference to FIG. 3B, the small cell networking device 200A (as well as small cell networking device 200B) includes at least one wireless transceiver module operable to provide wireless communication capability to a wireless network controlled by an MNO. After construction of the modified component, such as small cell device 200A, the modified component is installed in place of the original component (i.e., door 201 in FIG. 2A) in the object (i.e., the light fixture 206 or 206A) so as to increase the aesthetic appeal of the small cell device 200A as compared to known small cells, which are typically large, independent structures clamped onto a side or a top of an object.

Moreover, the method can include removing an original component of one of a variety of objects including, without limitation a streetlight, a light pole, an LED board, a bracket, a street sign, a highway sign, a bus stop shelter, an ATM, a phone booth, a building, an HVAC unit, a mailbox, a billboard, a light, a parking sign, a stop light, a speed limit sign, a solar cell, a crosswalk sign, a tunnel, a utility box, a water tower, a crane, a radio antenna tower, a store, an awning, a roof, and a parking pay station. A modified component can be constructed, as described herein, such that a small cell device is housed within the modified component, and the modified component is installed in the object in place of the original component.

As further explained with reference to FIG. 3A below, constructing the modified component can include incorporating into the modified component at least one or more of: an antenna, an identity module, a GPS module, a security module, a memory, a cellular parameter module, a cellular-based gateway, an input module, an output module, a wired transceiver module, and a light sensor module, among other components, wherein such components are not physically visible to a user, as they are housed within the small cell device 200A which forms the modified component to replace the original component.

In an embodiment, the small cell device 200A includes a body 210A having a first surface 218A raised or protruding from the light fixture 206A. The first surface 218A has a generally curved shape, similar, in part, to the sidewall of a cylinder. As such, the first surface 218A tapers towards a first distal end 222A of the body 210A such that a thickness of the body 210A changes over its length. However, it is to be appreciated the first surface 218A may also be flat and planar, curved in a continuous manner, or come to one or more abrupt edges along its length, such as in a step-down configuration. In such cases, a thickness of the body 210A may remain constant over a length of the body 210A or may change multiple times over a length of the body 210A. The first surface 218A is integrally formed with a second surface 220A, which is generally flat and planar. Alternatively, the second surface 220A may be rounded or may have one or more indentations. In many cases, the body 210A is formed as a single, integral, unitary component including first and second surfaces 218A, 220A, but it is to be appreciated that the body 210A of the small cell device 200A can also be formed of one or more components joined together with various known fastening or adhesive means such a flex joints, welds, rivets, nuts and bolts. In an embodiment, the second surface 220A is substantially parallel with respect to a first, or bottom, surface 226A of the light fixture 206A. The first surface 218A may in some cases include any number of heat transfer structures, such as heat sink fins, arranged to facilitate air flow and dissipate heat generated behind the first surface 218A.

In various embodiments where such heat transfer structures are employed, the length of each sub-structure (e.g., each fin) is equivalent to less than half, less than or equal to one third, or less than or equal to one quarter of a length of the small cell device 200A, although it is possible for the length of a plurality of heat transfer structures to be equivalent to half or more of the length of the small cell device 200A. Further, it is to be understood that the plurality of heat transfer structures may include only a single heat transfer structure (e.g., one fin). Alternatively, the plurality of heat transfer structures may include two, three, four, five, six, seven, eight, nine, or ten or more heat transfer structures. In some embodiments, as in FIG. 2B, there are no heat transfer structures. In many cases, each of the heat transfer structures are aligned parallel to one another, with each sub-structure having about the same size and shape, although such an arrangement is certainly not required in light of the present disclosure.

In some embodiments, a first distal end 222A of the body 210A of the small cell device 200A may include a hole 205A for inserting a fastener in the light fixture 206A, such that the small cell device 200A is supported at one end with the hinge 216A and securely physically attached to the light fixture 206A at the first distal end 222A with the fastener.

The small cell 200A may be electrically, mechanically, or electromechanically coupled to a multi-pin NEMA connector. The NEMA connector may be arranged to pass wired power into the small cell device 200A. Power that is passed into the small cell device 200 may be consumed or stored. A small cell device 20 will include a light control module to direct illumination of a source of light, and the light control module will have a dimming controller for detecting light, or some other controller for processing other events, as described herein. Moreover, it is to be appreciated that the electronic components discussed herein, including with reference to FIG. 3A, may be incorporated into the body 210A of the small cell device 200A.

In an embodiment, such electronic components may extend into a body of the light fixture 206A, but it is to be appreciated that because the light fixture 206A may have a void, cavity, or some other hollow, that space is available to accommodate at least some portion of the small cell structures. In other embodiments, the body 210A of the small cell device 200A may have a void, cavity, or some other hollow to accommodate the electronic components. The electronic components of the small cell device 200A may be connected to electrical or network lines in, or through, the light pole 202A, the support 204A, and the light fixture 206A with cables, wherein such lines are already present in the light pole 202A, the support 204A, and the light fixture 206A, or may be located proximate the base of the light pole 202A. As such, the modular design of the small cell device 200A permits any desirable arrangement of cables to pass power, communications, control signals, or other information into, out from, or into and out from the small cell device 200A while hiding such cables or wires from the view of a user or other person on the street.

Moreover, the small cell device 200A is designed with an International Protection or Ingress Protection ("IP") rating of at least IP66, meaning that the small cell device 200A is dust tight and generally waterproof against water projected in powerful jets (i.e. a 12.5 mm nozzle) against the small cell device 200A from any direction without creating harmful effects, or without shorting the internal electronic components within the small cell device 200A. A successful test to obtain an IP66 rating includes 3 minutes of testing with water ejected from a 12.5 mm nozzle at a volume of 100 liters per minute and a pressure of 100 kPa at a distance of 3 m.

As such, the embodiment of the small cell device 200A illustrated in FIG. 2B provides an aesthetically pleasing device mounted to, or otherwise integrated into, a common object, such as light fixture 206A.

Figure 2C:
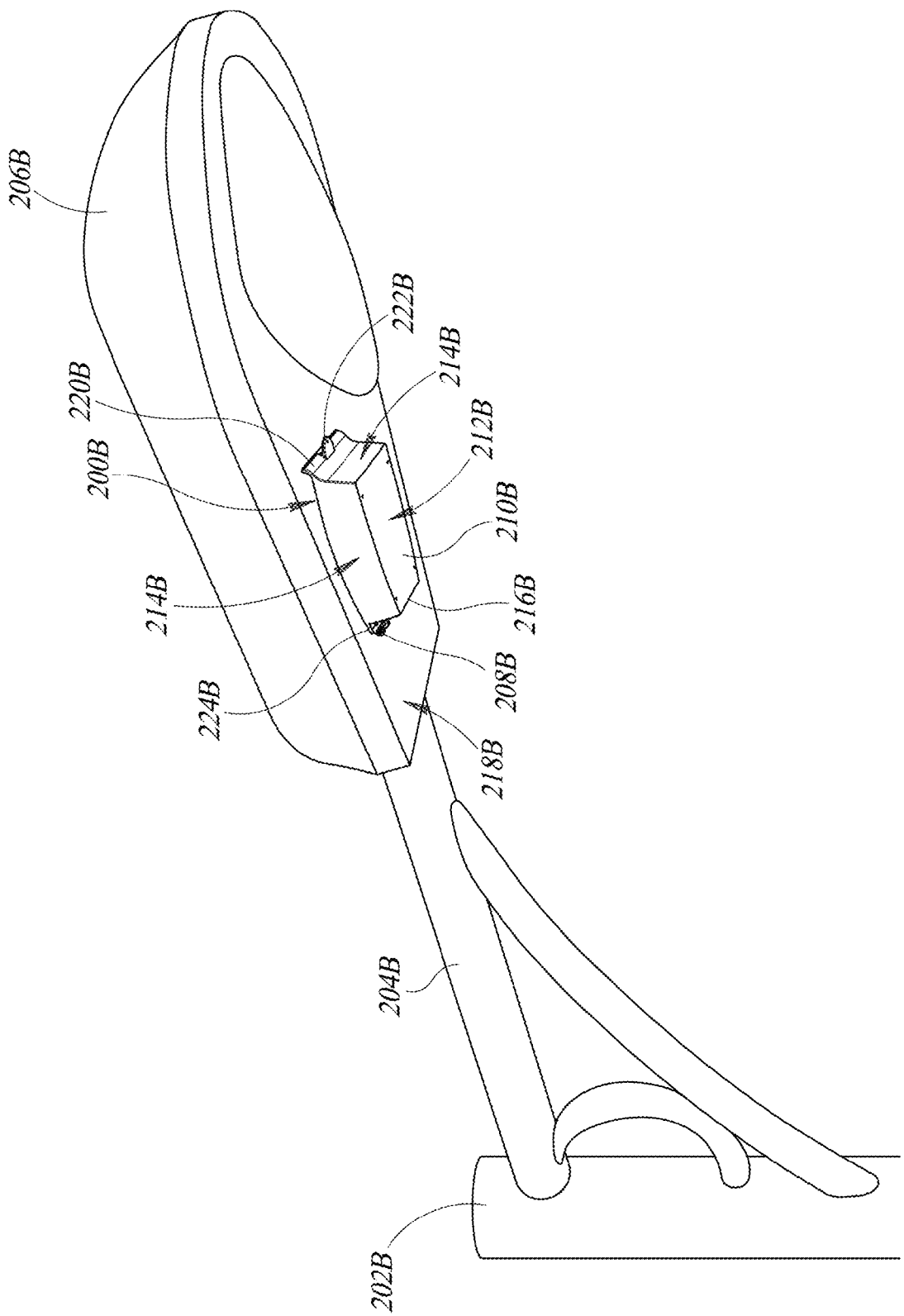
FIG. 2C is a perspective view of an alternative exemplary embodiment of a small cell integrated into a modified component of a light fixture coupled to a light pole.

FIG. 2C illustrates an alternative exemplary embodiment of a small cell networking device 200B integrated with a light fixture 206B, which itself is coupled to a light pole 202B by a support 204B. The light pole 202B, the support 204B, and the light fixture 206B may be substantially similar, if not identical, to the light pole 202A, support 204A, and the light fixture 206A (FIG. 2B) and as such, description of these features will not be repeated in the interest of efficiency. The small cell device 200B of FIG. 2C is arranged as a networking device, but in other embodiments, the small cell device 200B includes smart sensor capability, as described above with reference to FIG. 1, such that the small cell device 200B is a combination device. In other words, in various embodiments, the small cell device 200B is a small cell networking device, a smart sensor device, a combination device, some other wireless networking device, or some other control device.

In the light fixture 206B of FIG. 2C, the small cell device 200B comprises a modified component of the light fixture 206B, similar to small cell device 200A in FIG. 2A. In other words, light fixtures, such as light fixture 206B, commonly include an access door (such as door 201 in FIG. 2A), wherein the door can be removed and replaced with a modified component, such as the small cell device 200B. In the embodiment of FIG. 2C, the small cell device 200B is rotatable about a hinge 216B, so that access to an interior of the lighting device 206B is not restricted. In other words, the door, such as door 201, can be removed from a permanently affixed structure (i.e., light fixture 206B), and replaced with a modified component, wherein the small cell networking device 200B is incorporated into or integrated into the modified component. As such, the small cell networking device 200B may also be referred to as a "door" or a "removable component" or a "modified component" as the housing for the small cell networking device 200B is installed in place of the original removable component in a permanently affixed object (i.e., light fixture 206B, or any of the permanently affixed objects described with reference to FIGS. 4A-W).

In an embodiment, the small cell device 200B includes a body 210B with a generally rectangular shape having a first surface 212B raised or protruding from the light fixture 206B. As such, the first surface 212B is generally flat and planar as are sidewall surfaces 214B, wherein the surfaces 212B, 214B meet at abrupt edges 216B. In this embodiment, a thickness of the body does not necessarily change along its height, but rather, remains constant. In many cases, the body 210B is formed as a single, integral, unitary component including the first surface 212B and sidewall surfaces 214B, but it is to be appreciated that the body 210B of the small cell device 200B can also be formed of one or more components joined together with various known fastening or adhesive means such a flex joints, welds, rivets, nuts and bolts.

In yet further embodiments, the first surface 212B is substantially parallel (i.e., within plus or minus 3 degrees of parallel) with respect to a first, or bottom, surface 218B of the light fixture 206B and the sidewall surfaces 214B are perpendicular to the first surface 218B, or substantially perpendicular (i.e., within plus or minus 3 degrees of perpendicular). The first surface 212B may in some cases include any number of heat transfer structures (similar to small cell device 200A), such as heat sink fins, arranged to facilitate air flow and dissipate heat generated by electronic components behind the first surface 212B. In other embodiments, the first surface 212B acts as a heat sink, wherein heat from the electronic components within the small cell device 200B is transferred to the first surface 212B via convection, conduction, or radiation, to be dissipated by the first surface 212B.

In some embodiments, a first distal end 220B of the body 210B of the small cell device 200B may include a hole 220B for inserting a fastener in the light fixture 206B, such that the small cell device 200B is supported at a second distal end 224B with the hinge 208B and securely physically attached to the light fixture 206B at the first distal end 220B with the fastener.

The small cell 200B may be electrically, mechanically, or electromechanically coupled to a multi-pin NEMA connector. The NEMA connector may be arranged to pass wired power into the small cell device 200A. Power that is passed into the small cell device 200 may be consumed or stored. A small cell device 20 will include a light control module to direct illumination of a source of light, and the light control module will have a dimming controller for detecting light, or some other controller for processing other events, as described herein. Moreover, it is to be appreciated that the electronic components discussed herein, including with reference to FIG. 3A, may be incorporated into the body 210B of the small cell device 200B, as described below with reference to FIG. 3C.

In an embodiment, such electronic components may extend into a body of the light fixture 206B, but it is to be appreciated that because the light fixture 206B may have a void, cavity, or some other hollow, that space is available to accommodate at least some portion of the small cell electronic components. In other embodiments, the body 210B of the small cell device 200B may have a void, cavity, or some other hollow to accommodate the electronic components. The electronic components of the small cell device 200B may be connected to electrical or network lines in, or through, the light pole 202B, the support 204B, and the light fixture 206B with cables, wherein such lines are already present in the light pole 202B, the support 204B, and the light fixture 206B, or may be located proximate the base of the light pole 202B. As such, the modular design of the small cell device 200B permits any desirable arrangement of cables to pass power, communications, control signals, or other information into, out from, or into and out from the small cell device 200B while hiding such cables or wires from the view of a user or other person on the street.

Moreover, the small cell device 200B is designed with an International Protection or Ingress Protection ("IP") rating of at least IP66, meaning that the small cell device 200B is dust tight and generally waterproof against water projected in powerful jets (i.e. according to the test parameters described below) against the small cell device 200B from any direction without creating harmful effects, or without shorting the internal electronic components within the small cell device 200B. A successful test to obtain an IP66 rating includes 3 minutes of testing with water ejected from a 12.5 mm nozzle at a volume of 100 liters per minute and a pressure of 100 kPa at a distance of 3 m.

As such, the embodiment of the small cell device 200B illustrated in FIG. 2C provides an alternative example of an aesthetically pleasing device mounted to, or otherwise integrated into, a common object, such as light fixture 206B.

FIG. 3A is a block diagram embodiment of exemplary electronic components 300, or a plurality of electronic components, within a small cell networking device, such as small cell device 302 described below with reference to FIG. 3B, or small cell devices 200A or 200B, for example. It is to be appreciated that such electronic components 300 are illustrated in this particular arrangement simply for ease of understanding the embodiment and the components 300 and in reality, that such electronic components 300 may be incorporated into various housings of various sizes, shapes, and orientations, with the small cell device 300 illustrated in FIG. 3B merely being one non-limiting, non-exclusive example. Moreover, although the electronic components 300 illustrated in FIG. 3A are illustrated as a system with a particular number of components, it is to be appreciated that embodiments of the present disclosure include more or less components than those specifically illustrated in FIG. 3A. As such, the present disclosure is not limited to the exact configuration or number of components illustrated with respect to FIG. 3A.

In an embodiment, a processor module 340 includes an applications processor as well as other peripheral circuitry for the processor such as power circuitry, clock circuitry, memory control circuitry, and the like. The processor module 340 is communicatively coupled to a memory module 342. The memory module 342 includes memory of one or more types, which may be desirably partitioned into small cell networking device owner areas, one or more MNO areas, one or more municipality areas, one or more third-party areas, global areas, executable code areas, parameter areas, system areas, sensor areas, IoT areas, secure areas, unlicensed communication areas, licensed communication areas, and other areas as selected or otherwise implemented by one or more computing professionals.

The embodiment of the electronic components 300 includes one or more optional input/output modules 344 and one or more optional wired transceiver modules 346. The embodiment of FIG. 3A may include a first cable electromechanically coupled to an input/output module 344 and a second cable electromechanically coupled to wired transceiver module 346, but other embodiments are not so limited. As discussed herein, the modular design of small cell devices, such as the small cell device 302, permits any desirable arrangement of cables through connectors coupled to pass power, communications, control signals, or other information into, out from, or into and out from the small cell device. In other cases, the cables are optionally omitted, and any signals that might otherwise pass through first cable and second cable are instead passed through a standards-based connector such as a NEMA-based connector.

The embodiment of the electric components 300 includes at least one cellular-based gateway 348A, which is a networking module arranged as a gateway to a cellular-based network. The cellular-based network is controlled by a mobile network operator (MNO). The cellular-based gateway 348A enables functionality for a mobile device in proximity to the electronic components 300, such as a user proximate the small cell device 302, to conduct a wireless communication session using the cellular-based network controlled by the MNO. The wireless communication session may be a cellular phone call, a short message service (e.g., text) message, an electronic mail, an internet session (e.g., delivery of multimedia information through a browser or other client software application on the mobile device), a tracking message, or any other type of communication that passes data over the MNO-controlled cellular-based network.

Optionally, the embodiment of the electronic components 300 includes a second cellular-based gateway 348B, third cellular-based gateway, and any number of other cellular-based gateways 348N. By inclusion of multiple cellular-based gateways, the embodiment of the electronic components 300 enables a plurality of concurrent wireless communication sessions via the same or different MNO-controlled cellular-based networks.

Wireless communication sessions that are enabled through one or more cellular-based gateways 348A-348N may pass packetized data through one or more networking structures. In many cases, packetized data wirelessly received on the cellular-based network from at least one mobile device is communicated on or otherwise through a public switched telephone network (PSTN). The packetized data may be further communicated between the embodiment of electronic components 300 and the PSTN in one or more ways, such as via the secondary connector portion of an EI connector. In some embodiments, the packetized data is passed through the same or another cellular-based gateway 348A-348N to a cellular macrocell, to a landline, or to another small cell including the electronic components 300. In some embodiments, the packetized data is passed through a wired transceiver module 346 (e.g., PoE, digital subscriber line (DSL), broadband cable, or the like) and a cable (e.g., EI connector 108, or the like) to another computing device. In some embodiments, the packetized data is passed through a different cabled transceiver, such as a fiber optic transceiver and cable medium. In still other cases, the packetized data is passed through a wireless transceiver module 356, which may be a Wi-Fi (e.g., IEEE 802.11) transceiver or a different type of wireless transceiver (e.g., licensed RF, unlicensed RF, satellite) that communicates according to a different protocol (e.g., a proprietary protocol, a satellite protocol, or some other protocol). In yet further embodiments, the electronic components 300 include more than one wireless transceiver module 356, for example, two, three, four, or more wireless transceiver modules to concurrently pass the packetized data.

Operations of the one or more cellular-based gateways 348A-348N may be directed by a cellular-based parameter control module 350. In some cases, the cellular-based parameter control module 350 includes features that enable a small cell device embodiment systems integrator or some other party to provision the small cell device embodiment including electronic components 300 on a cellular-based network of a selected MNO. In this way, the MNO can itself provision each small cell device embodiment for operating on the cellular-based network it controls, or the MNO can authorize another entity to provision the small cell device embodiment. The feature set provided by the cellular-based parameter control module 350 promote efficiency, cost-effectiveness, rapid-deployment, temporary deployment, one or more revenue models, and many other benefits.

The electronic components 300 include a plurality of antennas to enable the wireless features of the device. Four antennas are represented in FIG. 3A, which include a first antenna 352A, a second antenna 352B, a third antenna 352C, and an Nth antenna 352N. Each antenna may be physically formed, arranged, positioned, and oriented to advantageously provide favorable communication of data. In some cases, one or more antennas are arranged to communicate data on a cellular-based network. In some cases, one or more antennas provide signal-sniffing capabilities. In some cases, one or more antennas are arranged to wirelessly communicate data on a non-cellular, licensed or unlicensed frequency or frequency spectrum as the case may be. In some cases, the radial design of the casted small cell cover will be used to enhance antenna performance.

A light sensor interface module 354 is included in electronic components 300 for incorporation into a small cell device, such as small cell device 200. The light sensor interface module 354 may include or otherwise enable light sensor functionality for one or more light sources such as a streetlight arranged in a light fixture that the small cell device embodiment is coupled to. In some cases, the light sensor interface module 354 communicates with a light sensor module. In other cases, a light sensor module is integrated with the light sensor interface module 354. The processor of processor module 340 may direct the operations of a light source based on data generated or otherwise provided by the light sensor interface module 354. For example, when ambient light in proximity to the small cell device embodiment including electronic components 300 reaches one or more lower threshold, the light source may be directed to turn on or otherwise increase its light output. Conversely, when the ambient light in proximity to the electronic components 300 reaches one or more upper thresholds, the light source may be directed to turn on or otherwise decrease its light output. In some cases, the processor intelligently directs the operation of an associated light source based on information received from any of the available transceivers. In this way, for example, when a first light source from a nearby light pole is undesirably reduced in intensity, a second light source in close proximity may be directed to increase its intensity. As another example, a municipality, law enforcement agency, third-party private entity, or some other entity may intelligently control light output from a plurality of light sources. The intelligent light control of a plurality of light sources may be used for safety, advertising, celebration, crowd control, or any number of other reasons. In at least one embodiment, the electronic components 300 wirelessly communicate its light sensor data to another smart device. In this embodiment or other embodiments, the electronic components 300 wirelessly receive light sensor data from one or more other smart devices.

The wireless transceiver module 356 may provide wireless communication capability to any one or more devices having corresponding wireless transceivers. In some cases, for example, using functionality provided by the wireless transceiver module 356, the electronic components 300 embedded in a small cell device embodiment are arranged to operate as a Wi-Fi access point. In this way, the electronic components 300 permit one or more mobile devices to access the internet. Municipalities or other entities may make internet services available over a determined geographic area (e.g., a neighborhood, a city, an arena, a construction site, a campus, or the like) to remote mobile devices that are in proximity to any one of a plurality of a number of embodiments incorporating the electronic components 300. For example, if many streetlight fixtures in a neighborhood or city are equipped with a small cell device, such as small cell device 302, then Wi-Fi service can be provided to a large number of users. What's more, based on seamless communication between a plurality of small cell device embodiments, the Wi-Fi service can be configured as a mesh that permits users to perceive constant internet connectivity even when the mobile device is in motion.

A global positioning system (GPS) module 358 is arranged in the block diagram embodiment of the electronic components 300. The GPS module 358 permits the small cell device 302 embodiment to accurately report its position to another computing device. In some cases, the position may be used to positively identify the particular small cell device 302 embodiment. In some cases, the position may be used to expressly direct service personnel to the site where the small cell device 302 embodiment is installed. The position information can be used diagnostically when a light source is failing, when an IoT device or some other sensor reports any type of information, and for other reasons. The highly accurate time-base of the GPS module may also be used by the small cell device 302 embodiment for weather data, almanac data, signal triangulation with other small cell device 302 embodiments, or for other purposes.

In some cases, an optional identity module 360 is arranged in the electronic components 300. The identity module 360 may include electronic, mechanical, or electromechanical switch circuitry, memory, a random number, a random number generator, a system-wide unique identifier, a world-wide unique identifier, or other such information. When combined with position information from the GPS module 358, the small cell device embodiment may be able to more accurately report its identity and position to another computing device. The identity information can be used diagnostically and for other reasons. In at least some cases, identity information provided by an identity module is used as a network identifier for the small cell device embodiment. The identity information may be arranged as a 32-bit number, a 64-bit number, another number having a structurally preferable bit-width, a combination of information that further conveys information about the capabilities of the small cell device embodiment incorporating the electronic components 300 (e.g., date of deployment, year of deployment, hardware version number, software version number, geographic location, or other such information).

A security module 362 is also optionally included in some embodiments of a small cell device incorporating the electronic components 300. The security module may include one or more of an encryption engine, a decryption engine, a random number generator, a secure memory, a separate processing device, and the like.

Figure 3B:
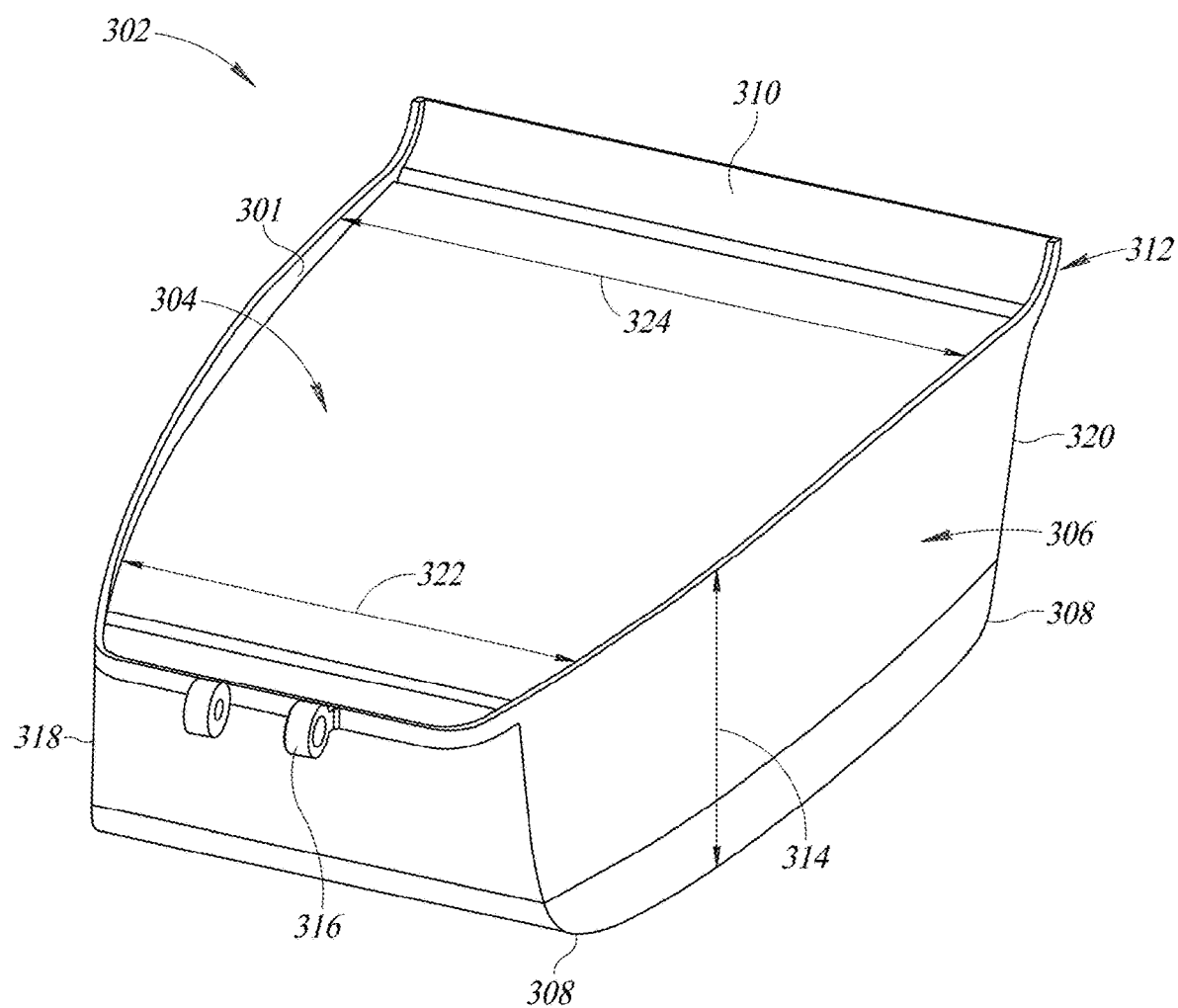
FIG. 3B is a perspective view of an alternative exemplary embodiment of a small cell.

FIG. 3B is a perspective view of an exemplary embodiment of a small cell device 302. The small cell 302 has a generally rectangular shape with a flat and planar first surface 304 and flat and planar sidewall surfaces 306. In this embodiment, several of the sidewall surfaces 306 meet at rounded edges or corners 308 in order to increase the aesthetic appeal of the design. Moreover, the small cell device 302 includes a tab or flange 310 extending proximate the first surface 304, wherein the tab 310 includes a curved outer surface 312. In an embodiment, the tab 310 extends into a light fixture or other device to which the small cell 302 is attached, in part, via hinge 316, in order to improve waterproof aspects of the small cell. As with small cells 200A and 200B described above, small cell 302 is designed with an IP66 rating against water and other contaminants entering the body 301.

A thickness or depth 314 of the device 302 is between 3.5 and 5 inches, but more preferably is equal to 4.25 inches or approximately 4.25 inches (i.e., between 4 and 4.5 inches). The small cell 302 further includes a first end 318 opposite a second end 320, wherein a first width 322 at the first end 318 is preferably less than a second width 324 at the second end 320. However, in other embodiments, the first and second widths 322, 324 are equal, or the second width 324 is greater than the first width 322. In addition, a body 301 of the device 302 can be formed from plastic, various metals (i.e., steel, aluminum, and their alloys), or other materials. In embodiments where the body 301 is metal, the body 301 may further comprise a heat sink for various electronic components housed within the small cell 302. In alternative embodiments, the body 301 includes dedicated heat sink structures within the body 301, wherein the body 301 acts in a supporting capacity to assist with heat dissipation through convection, conduction, or radiation, with the dedicated heat sink structures.

Figure 3C:
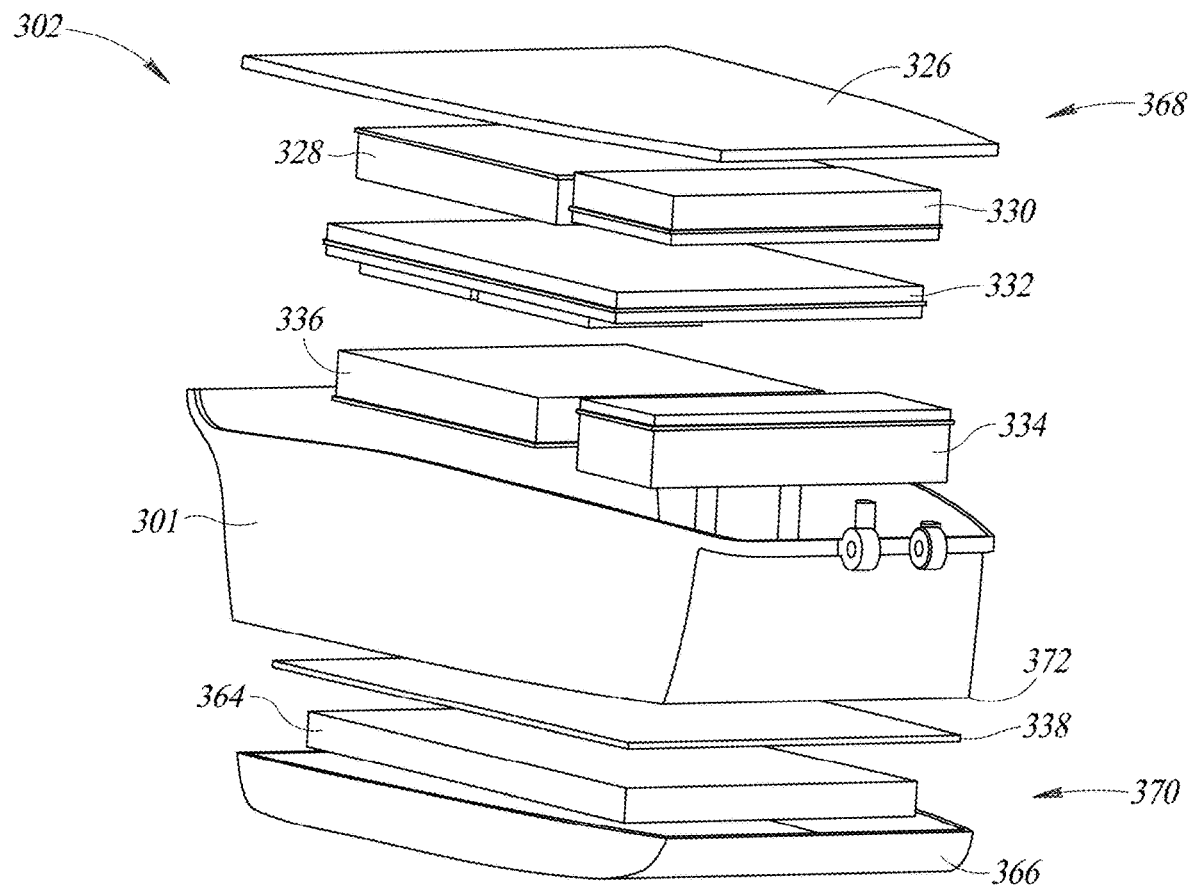
FIG. 3C is an exploded perspective view of the small cell of FIG. 3B illustrating various electronic components housed within the small cell.

FIG. 3C is an exploded view of the small cell 302 illustrating various electronic components, such as some or all of the electronic components 300, housed in the small cell 302. For example, the small cell 302 may be a 4×1 W RF power small cell (not including antenna gain) that includes a first heat sink 326 in a first, upper portion 368 of the small cell 302 and a second heat sink 338 in a second, lower portion 370 of the small cell 302, wherein the upper heat sink has a weight between 825 and 875 grams (g), but more preferably is 850 g or approximately 850 g (i.e., between 845 and 855 g). Additionally, in an embodiment, the first heat sink 326 forms an upper plate that is coupled to the body 301 so as to enclose the body 301. In other words, the first heat sink 326 includes the first surface 304 shown in FIG. 3B that is external to the small cell 302. The second heat sink 338 is positioned internally to the small cell 302 and proximate a bottom 372 of the body 301 so to form an intermediate layer between the body and an antenna board carrying one or more antennas, and an antenna cover 366. The antenna board 364 is preferably 260 millimeters (mm) long by 170 mm wide and weighs 350 g or approximately 350 g (i.e., between 345 g and 355 g) and the antenna cover 366 preferably weighs 260 g, or approximately 260 g (i.e., between 255 g and 265 g).

Beneath the first heat sink 326 is a first power amplifier 328 and an interface or interface board 330. The first power amplifier 328, which may also be referred to as a first power amplifier board, is preferably 160 long by 140 mm wide with a weight of 400 g or approximately 400 g (i.e., between 395 and 405 g) and utilizes 30 watts (W) of power during normal operation. The interface or interface board 330 has a size that is preferably 80 mm long by 140 mm wide with a weight of 120 g or approximately 120 g (i.e., between 115 g and 125 g) and uses 3.5 W of power during normal operation. As shown in FIG. 3C, the first power amplifier 328 is adjacent to the interface 330. Beneath the power amplifier 328 and the interface 330 is a main board 332. The main board 332 is 230 mm long by 140 mm wide with a weight of 620 g or approximately 620 g (i.e., between 615 g and 625 g), wherein the main board 332 utilizes 18 W of power under normal operation conditions.

Below the main board 332 is a power board 334 positioned adjacent to a second power amplifier or second power amplifier board 336. The power board 334 preferably has a size that is 60 mm long by 155 mm long with a weight of 150 g or approximately 150 g (i.e., between 145 g and 155 g), wherein the power board 334 utilizes 11.2 W of power during normal operation. The second power amplifier board 336 is identical to the first power amplifier board 328 in an embodiment, and as such, has the same dimensions, weight, and operating power specifications. Beneath the power board 334 and the second power amplifier board 336 is the second heat sink 338, followed by the antenna board 364 and the antenna cover 366 described above. Further, the body 301 has a weight of 1240 g or approximately 1240 g (i.e., between 1235 g and 1245 g).

In the context of the above discussion, it is to be appreciated that the stated dimensions of various components also includes dimensions that are more or less than those provided. For example, in various embodiments, each of the dimensions are approximately equal to the stated value, where "approximately" means within plus or minus 5 percent of the stated value (i.e., if the stated value is 100 mm, approximately 100 mm is equal to any dimension between 95 mm and 105 mm). Moreover, the shape of each component has been selected and designed according to the body 301 and the intended application (i.e., as a replacement door for a light fixture, as described herein). As such, other shapes and sizes of the electronic components are contemplated within the scope of the present disclosure, including, without limitation, circular or cylinder enclosures described below in FIGS. 4A-4W.

Moreover, references to "board" herein may refer to a circuit board, which may be a printed circuit board ("PCB"), including, without limitation, a single sided PCB, a double sided PCB, a multilayer PCB, a rigid PCB, a flex PCB, or a rigid-flex PCB. As is understood, any of the above circuit boards may include various electronic components coupled to, or carried by the circuit boards, including, for example, integrated circuits, integrated circuit chips or dies (including, without limitation, semiconductor chips or dies), wires, transistors, leadframes or pads, antennas, receivers, transmitters, transceivers, or other components. Moreover, each of the electronic components described above may be in electronic communication, either via wires (i.e., to transmit power or signals, among other functionality), or wirelessly to one or more of the other electronic components. Further, it is to be understood that any of the above can be coupled to one or more of the other electronic components or the body 301 of the small cell device 302 through one or more known coupling techniques or materials.

As such, in sum, for a 4×1 W RF power small cell, such as small cell 302, the total weight of the electronic components (including the antenna board 364 and the antenna cover 366) is 4390 g or approximately 4390 g according to the variations stated above. A maximum size of the components, when assembled, is 260 mm long by 170 mm wide by 105.6 mm high. Accordingly, a body for housing the components, such as body 301, preferably has an internal space or cavity with at least these dimensions, although in other embodiments, certain of the electronic components extend into a cavity of the structure to which they are attached, in which case, the body may have smaller dimensions than the above maximum. Total power consumption, assuming normal operating conditions, is 92.7 W.

Figure 3D:
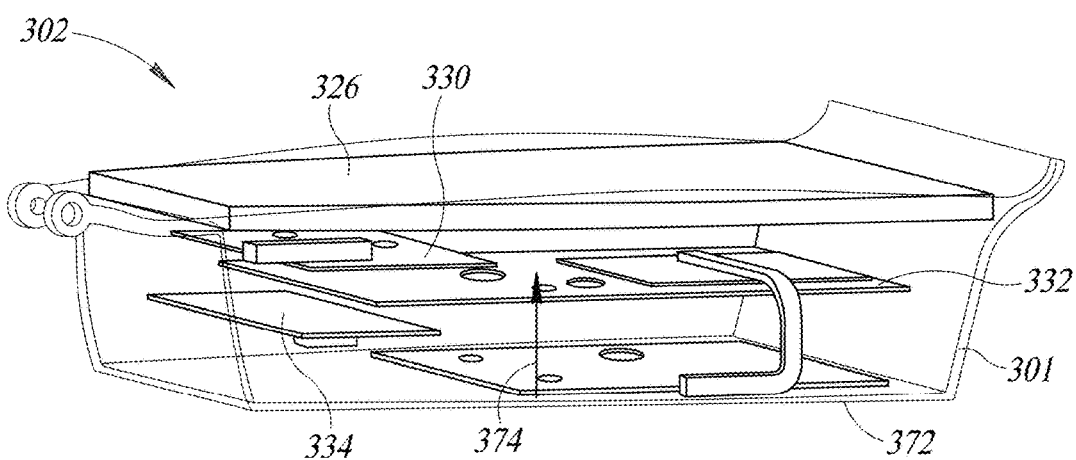
FIG. 3D is a perspective view of the small cell of FIG. 3B illustrating certain internal components of the small cell in additional detail.

FIG. 3D is a perspective view illustrating heat transfer within the small cell 302. As described above, the small cell 302 includes the first heat sink 326, the interface board 330, the main board 332 and the power 334. As shown in FIG. 3D by arrow 374, heat is generally transferred upwards through the body 301 from the base or bottom 372 of the body 301 towards the first heat sink 326, wherein the heat is dissipated by the first heat sink 326 as air contacts the first heat sink 326 to convey thermal energy away from the first heat sink 326. Such transfer of heat within the body 301 may be through convection, conduction, or radiation. Moreover, although not specifically illustrated, the second heat sink 338 dissipates heat generated by operation of the antenna board 364 in a similar manner. Additionally or alternatively, the second heat sink 338 dissipates a small portion of thermal energy received from the components above the second heat sink 328 in the body 301.

Figure 4A:
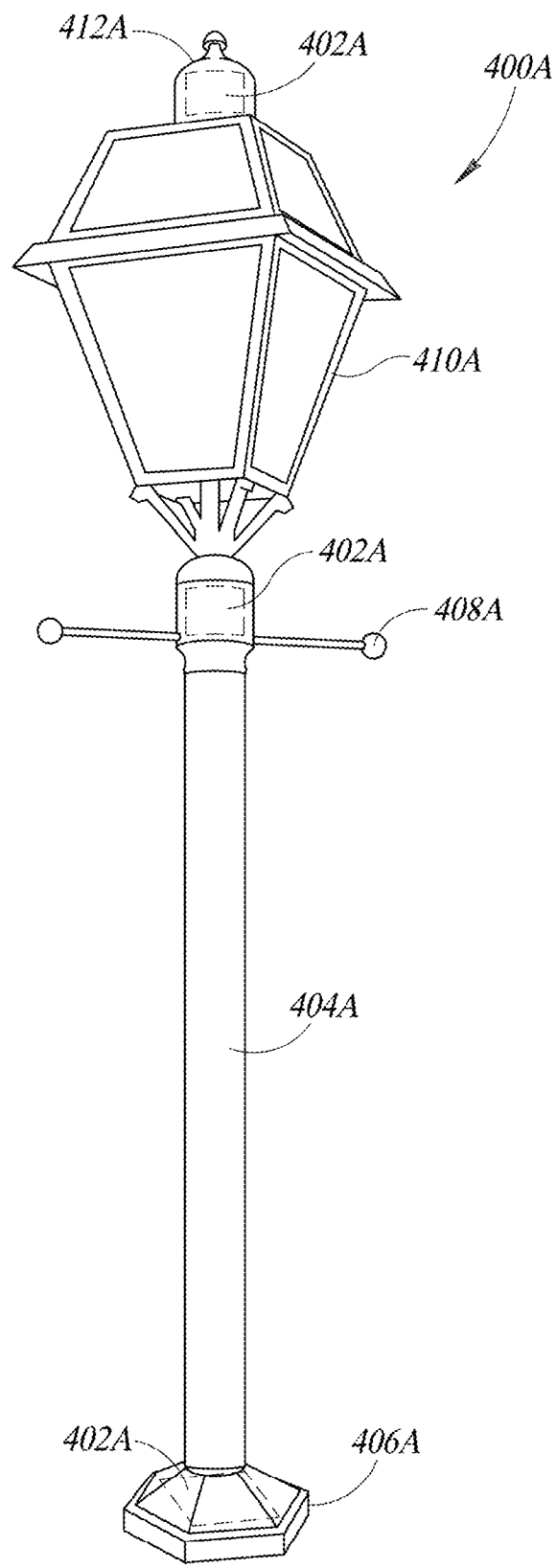
FIGS. 4A-4W are various views of alternative exemplary embodiments of the electronics of FIG. 3A mounted to, or integrated into, common objects within an urban environment.
Figure 4B:
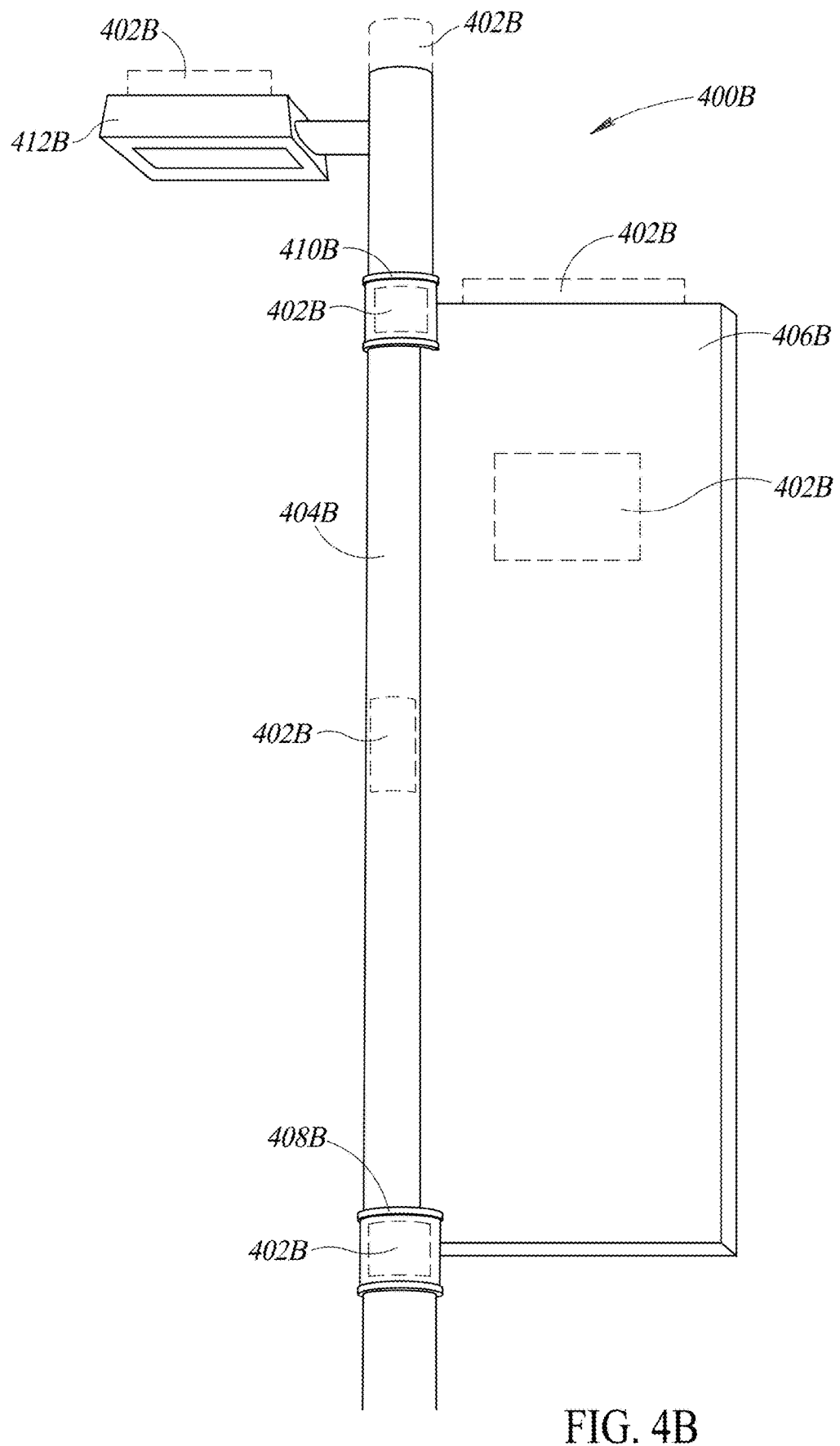
Figure 4C:
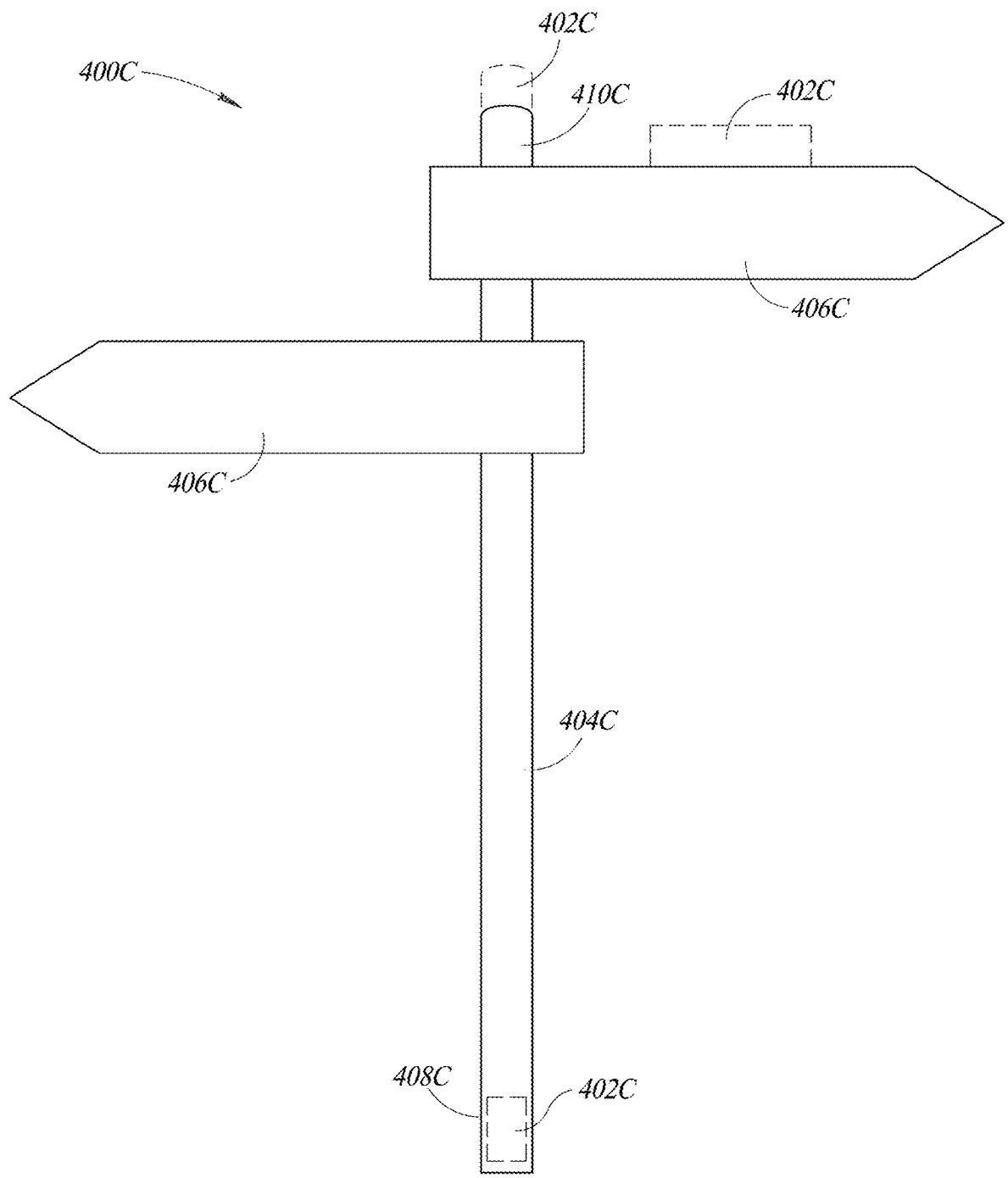
Figure 4D:
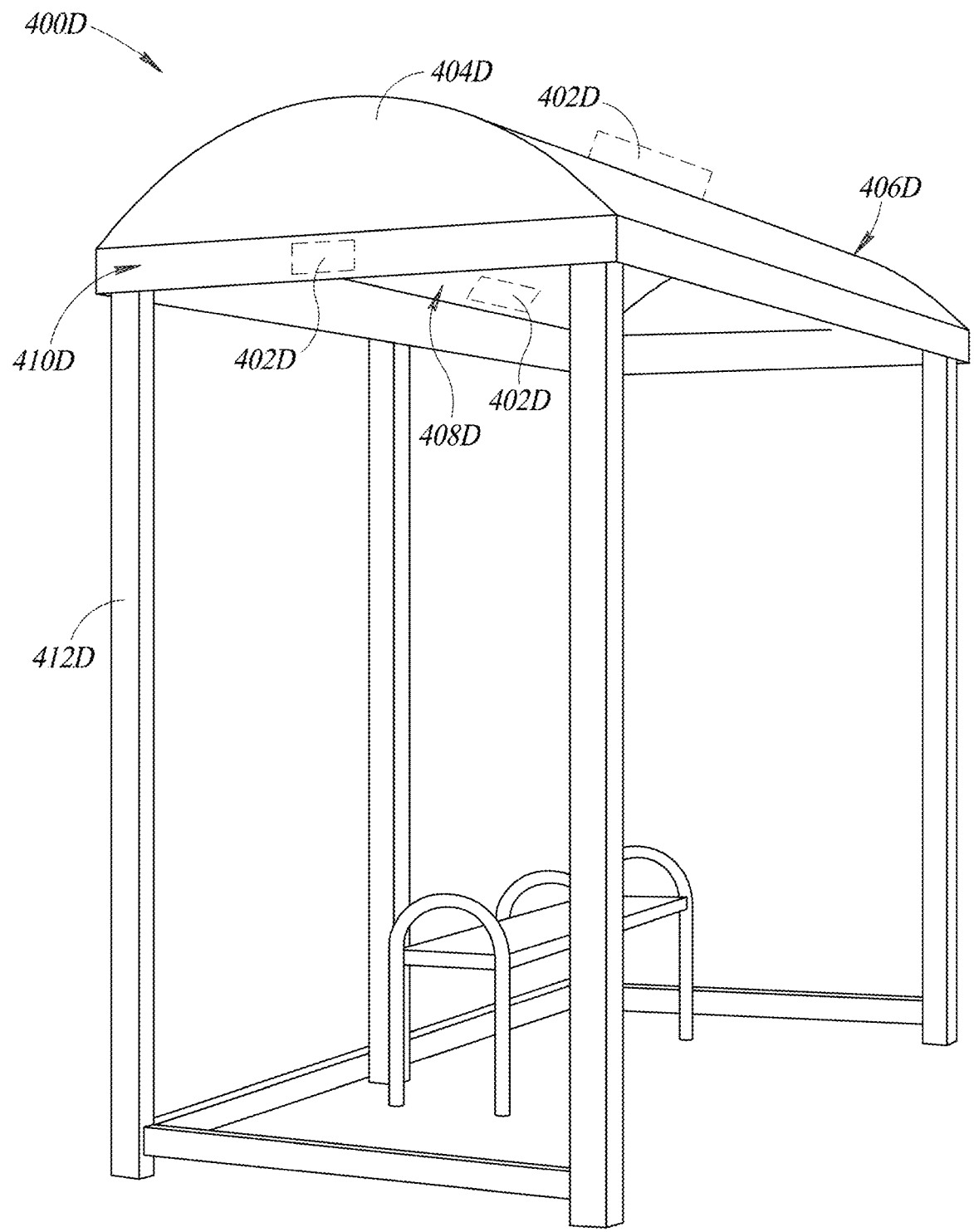
Figure 4E:
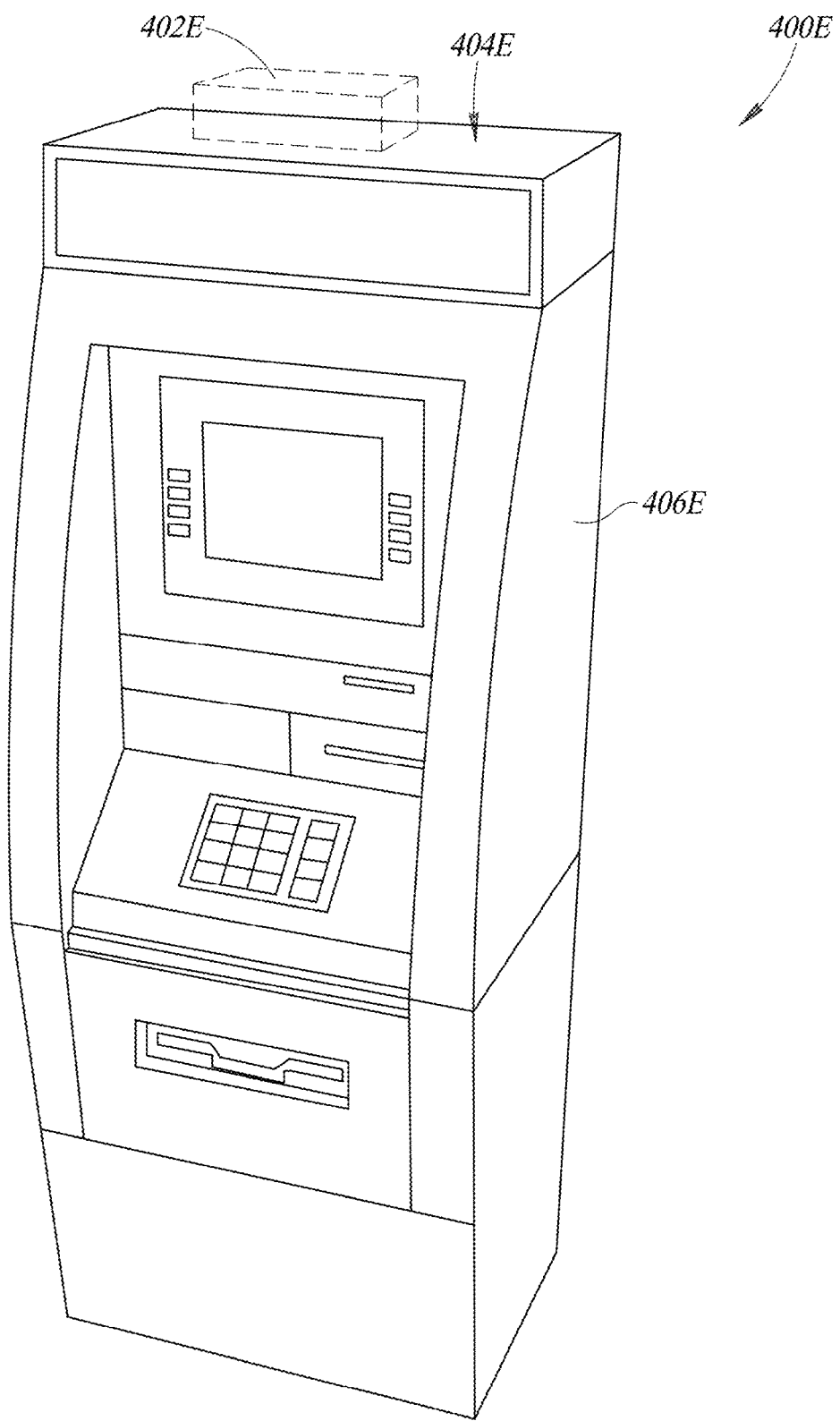
Figure 4F:
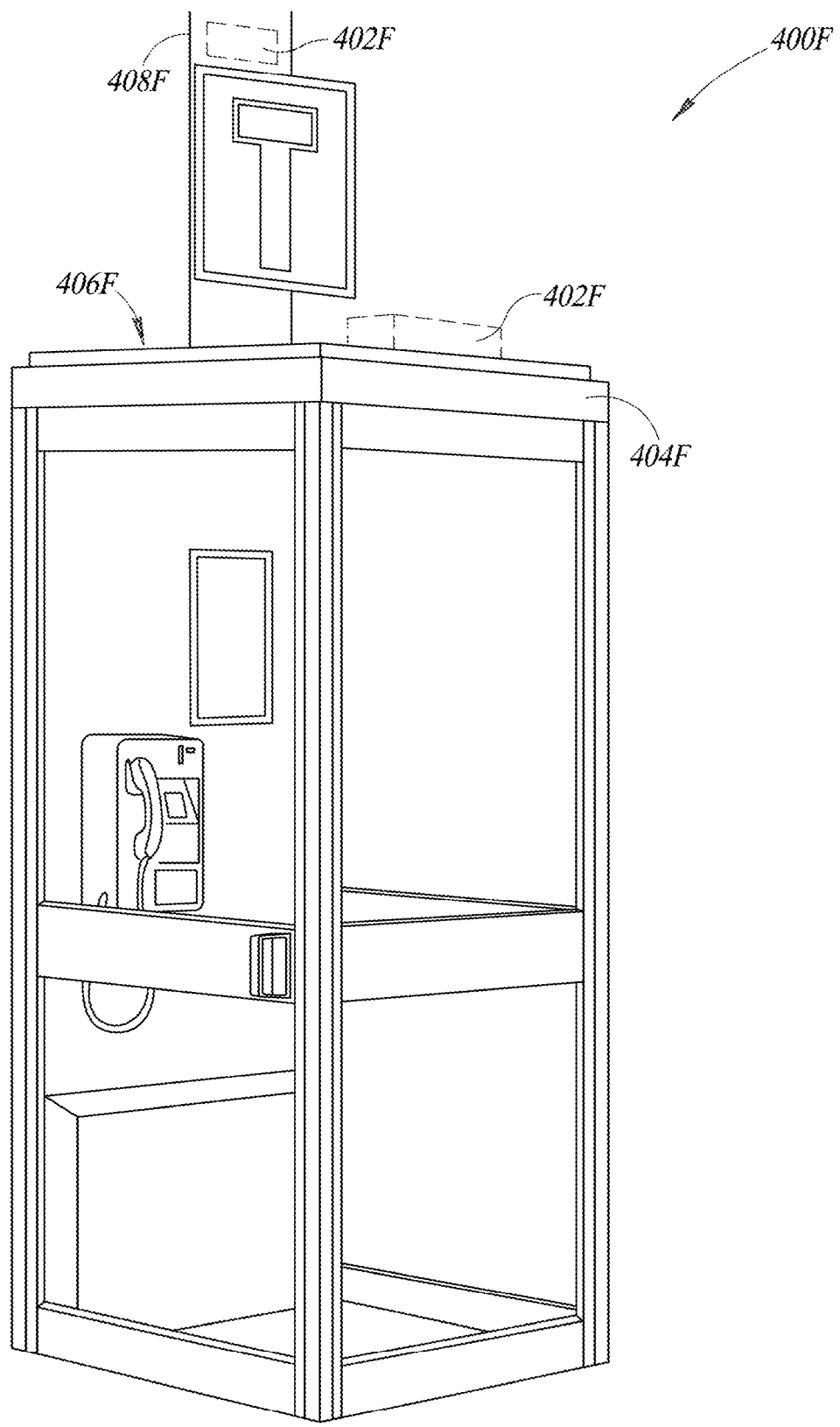
Figure 4G:
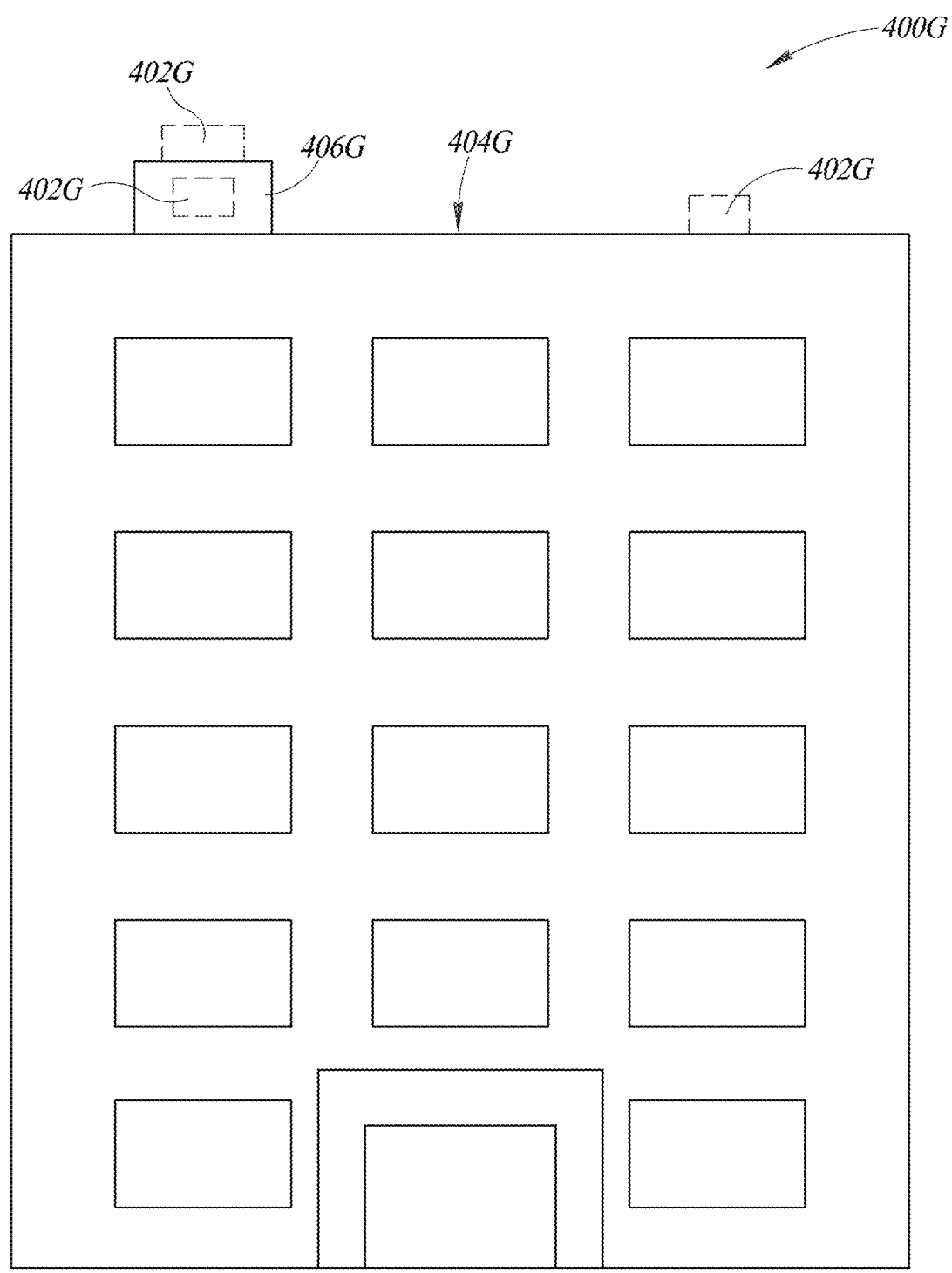
Figure 4H:
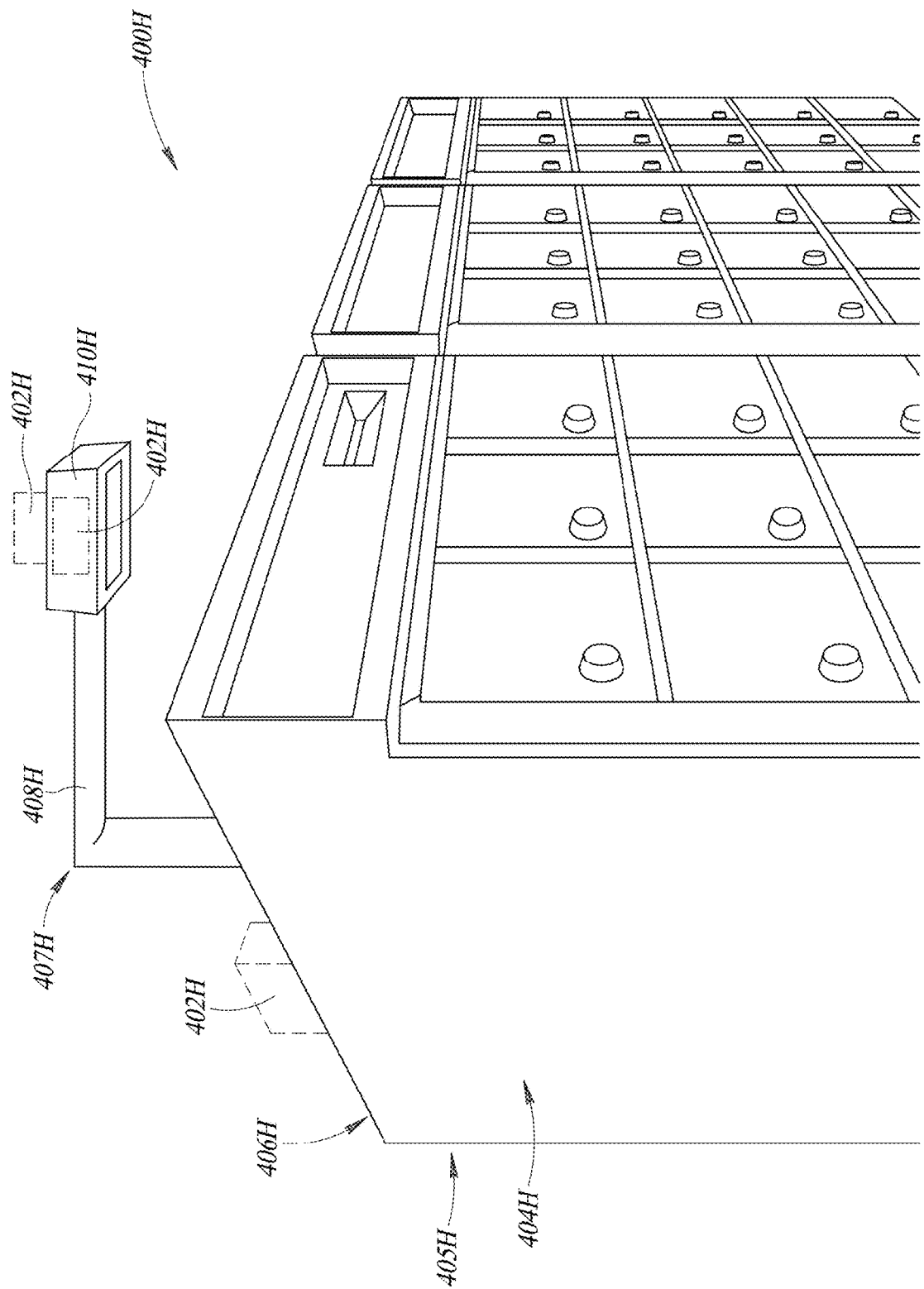
Figure 4I:
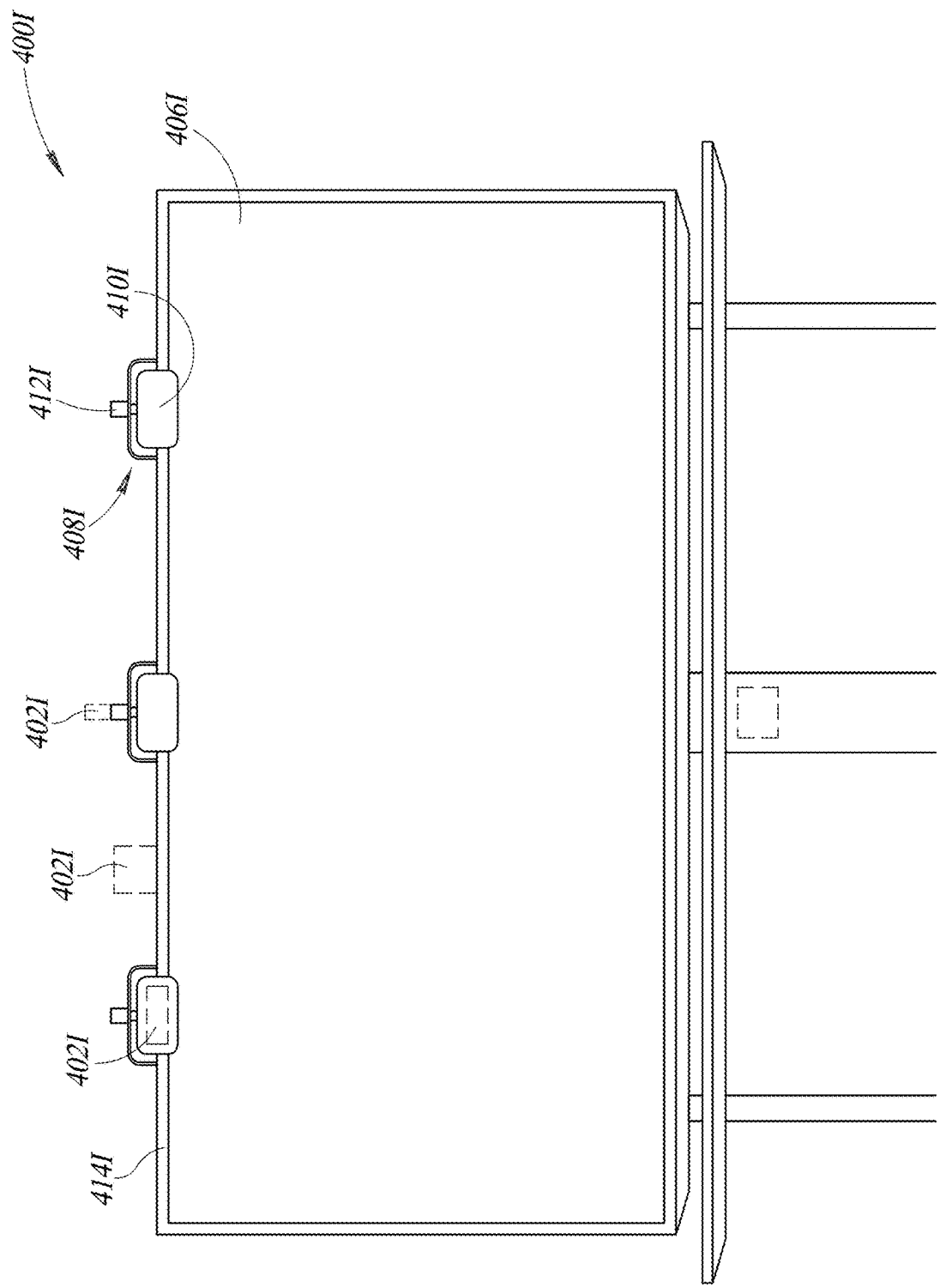
Figure 4J:
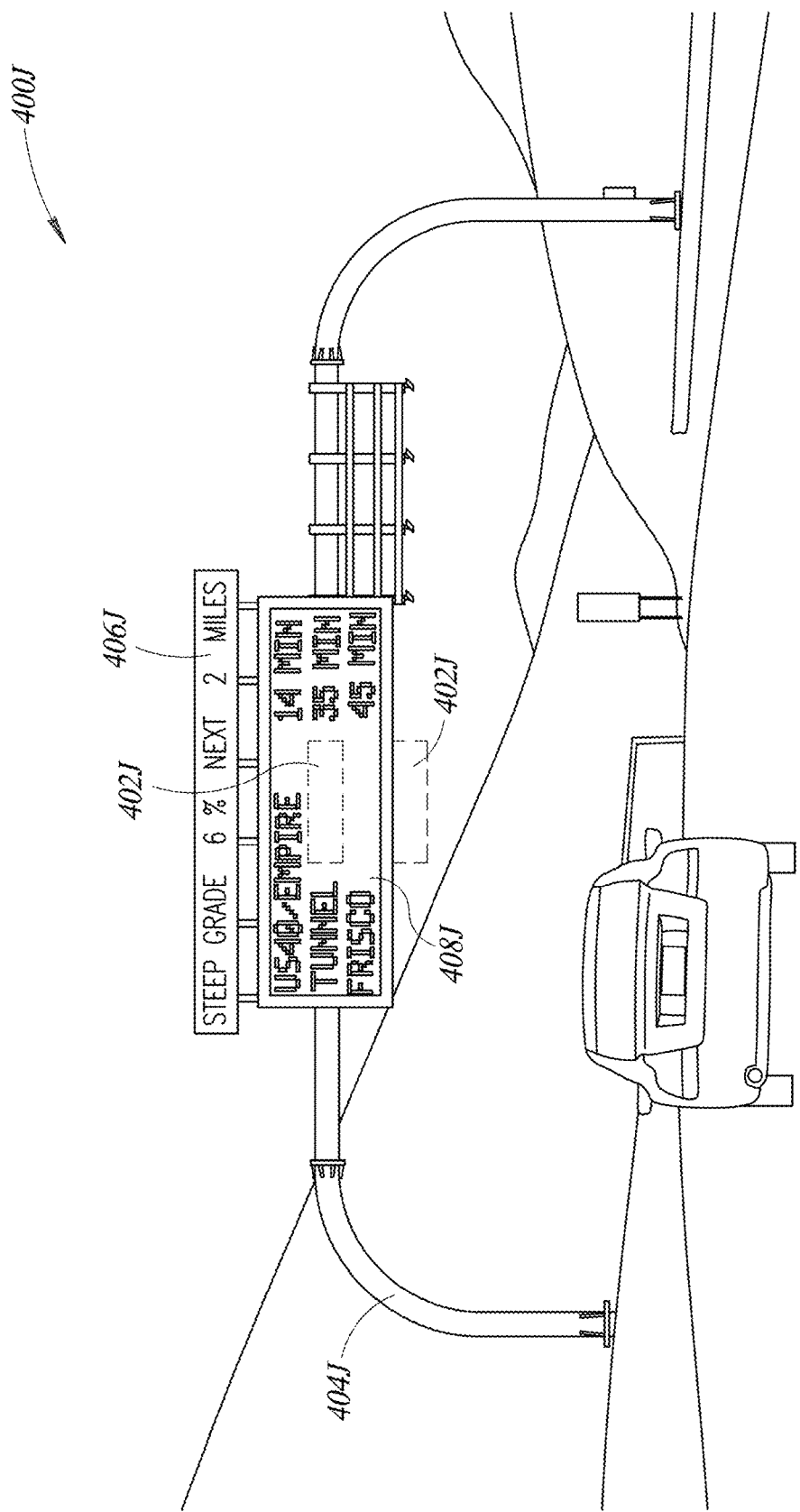
Figure 4K:
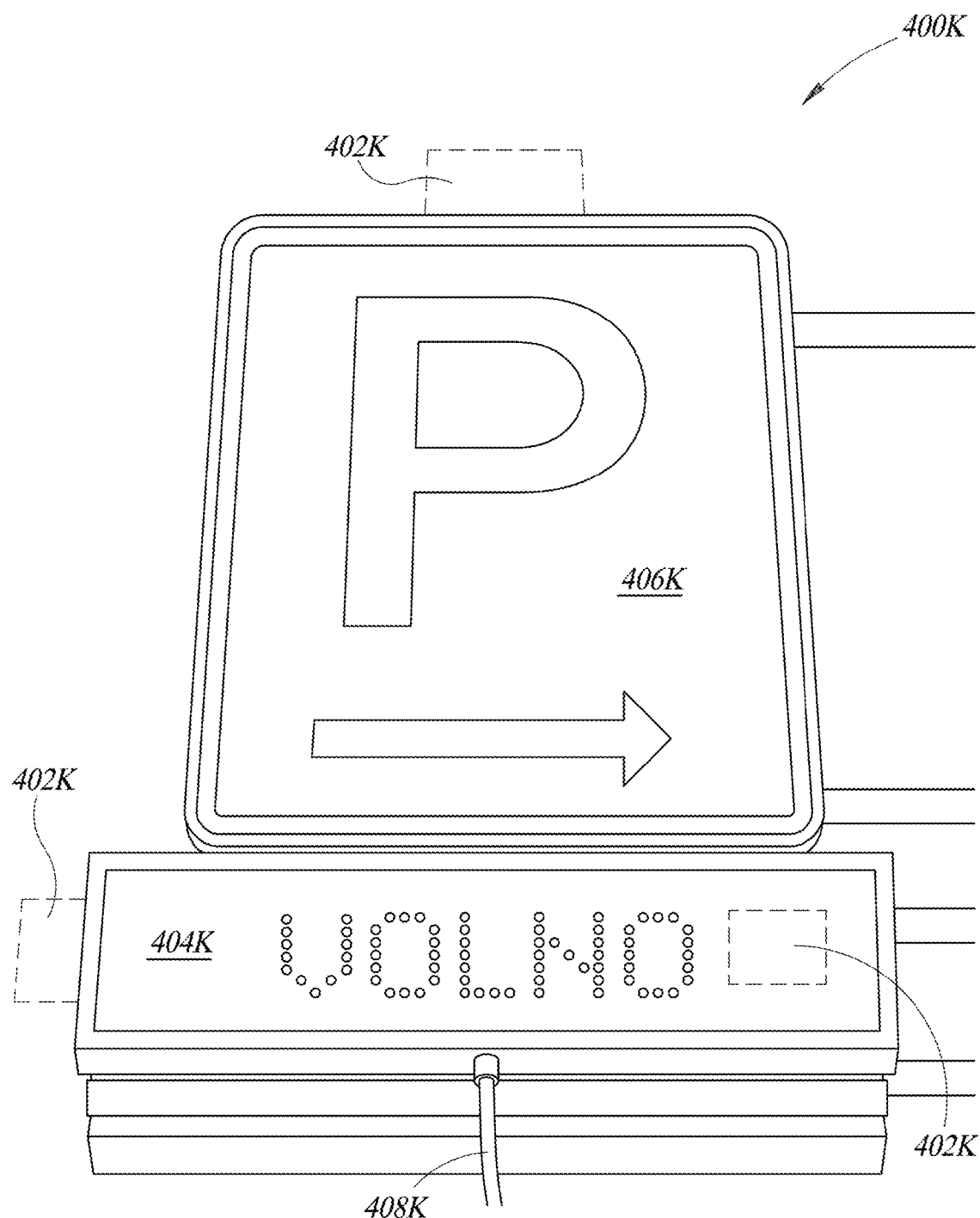
Figure 4L:
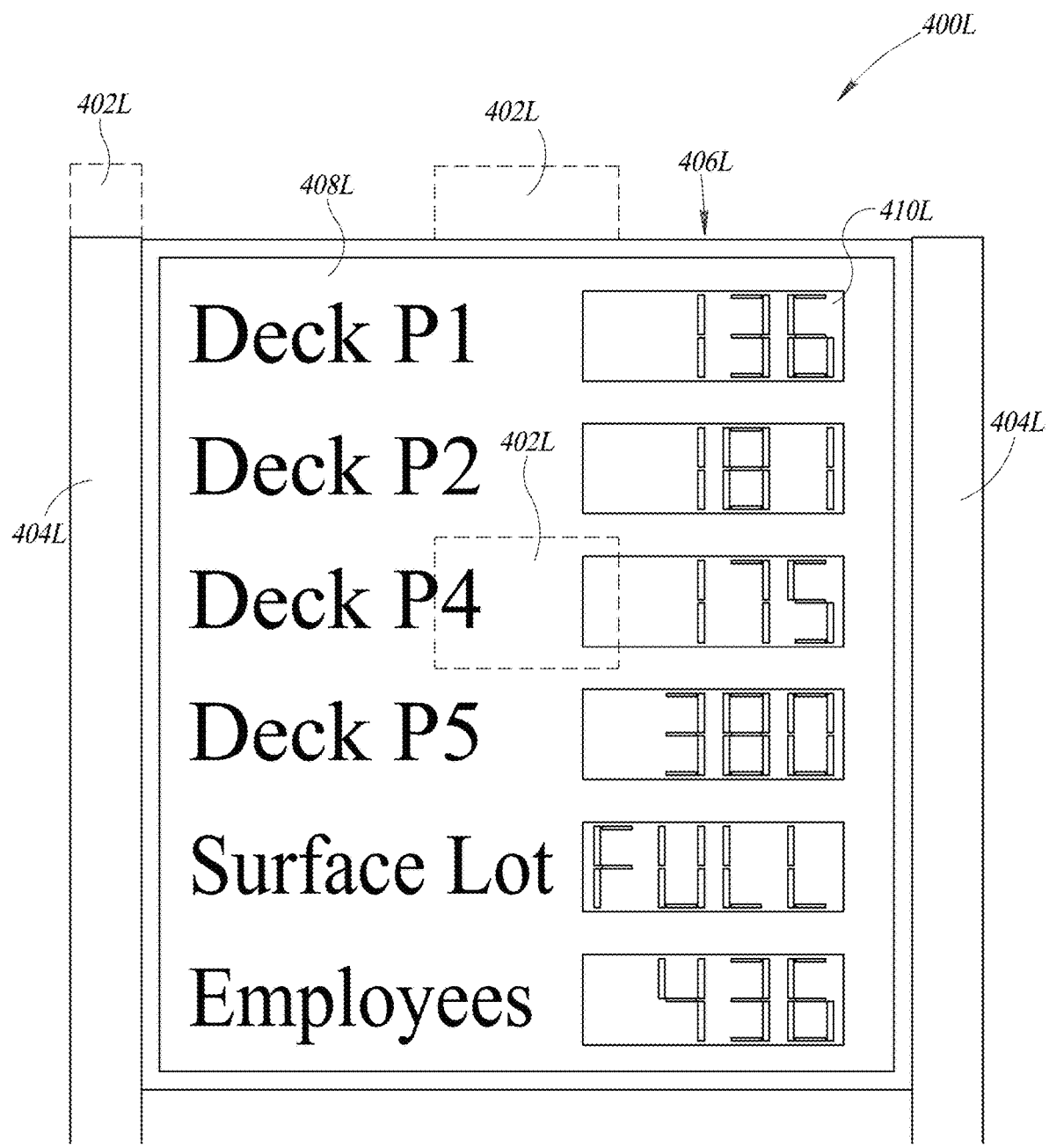
Figure 4M:
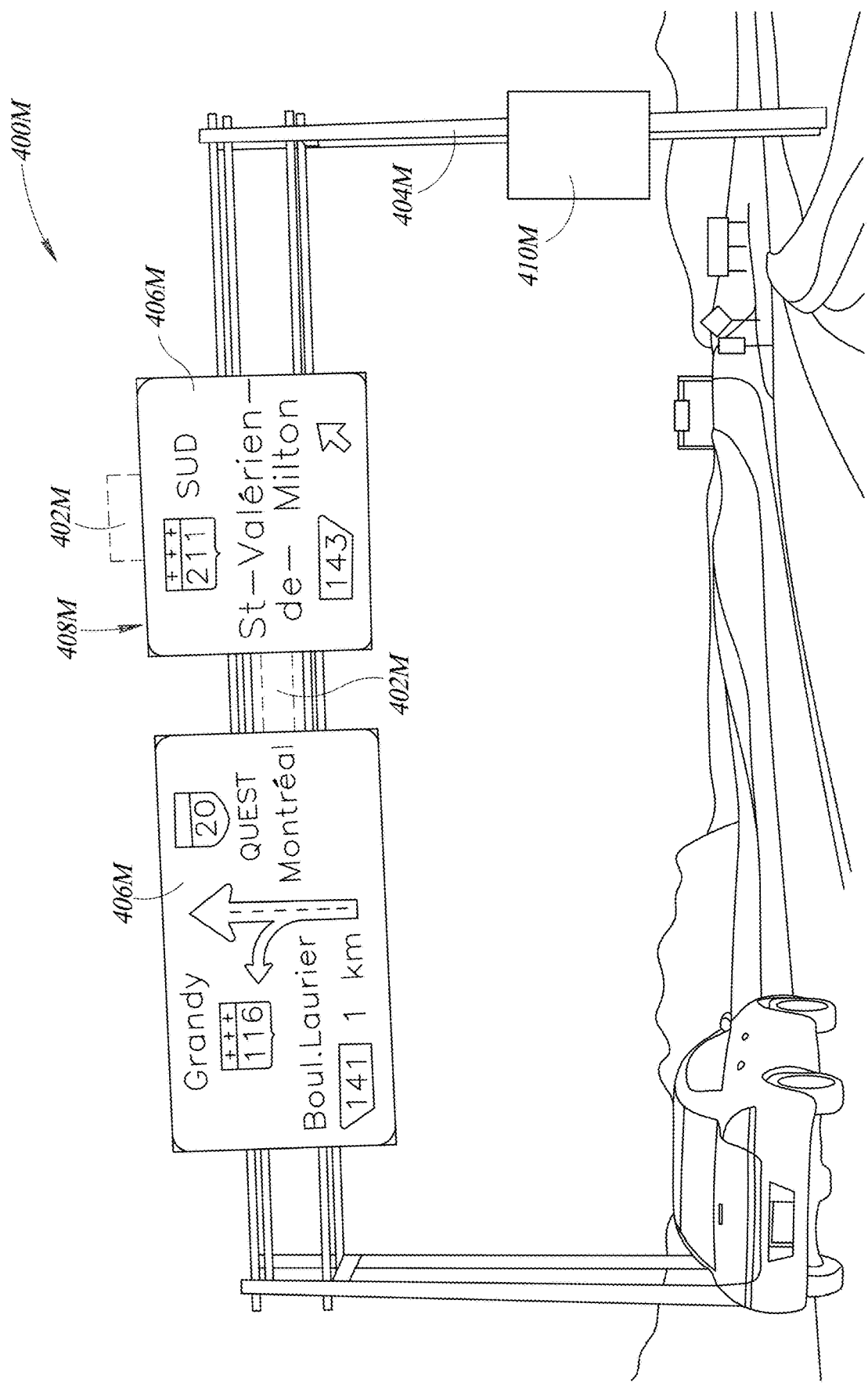
Figure 4N:
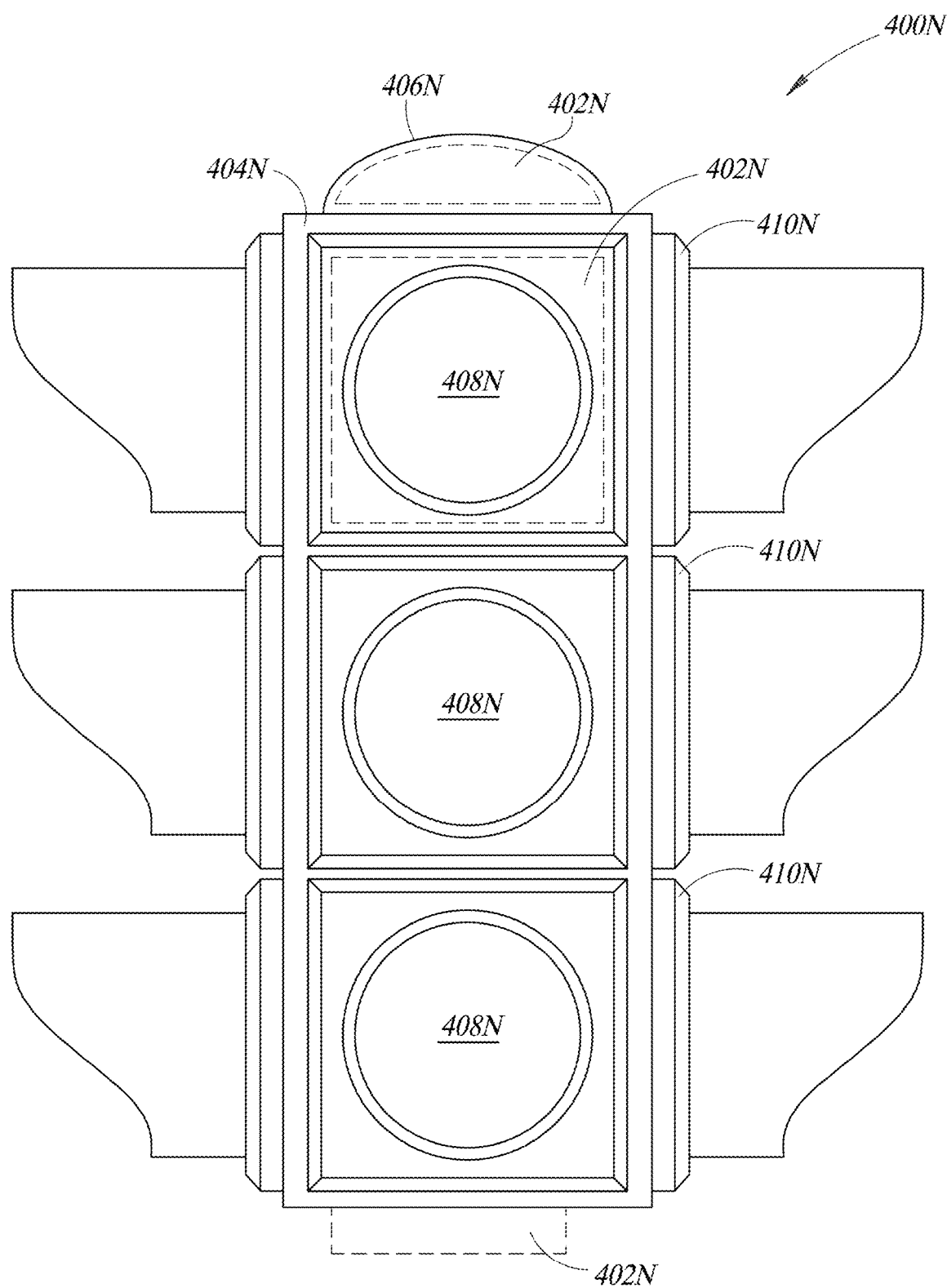
Figure 4O:
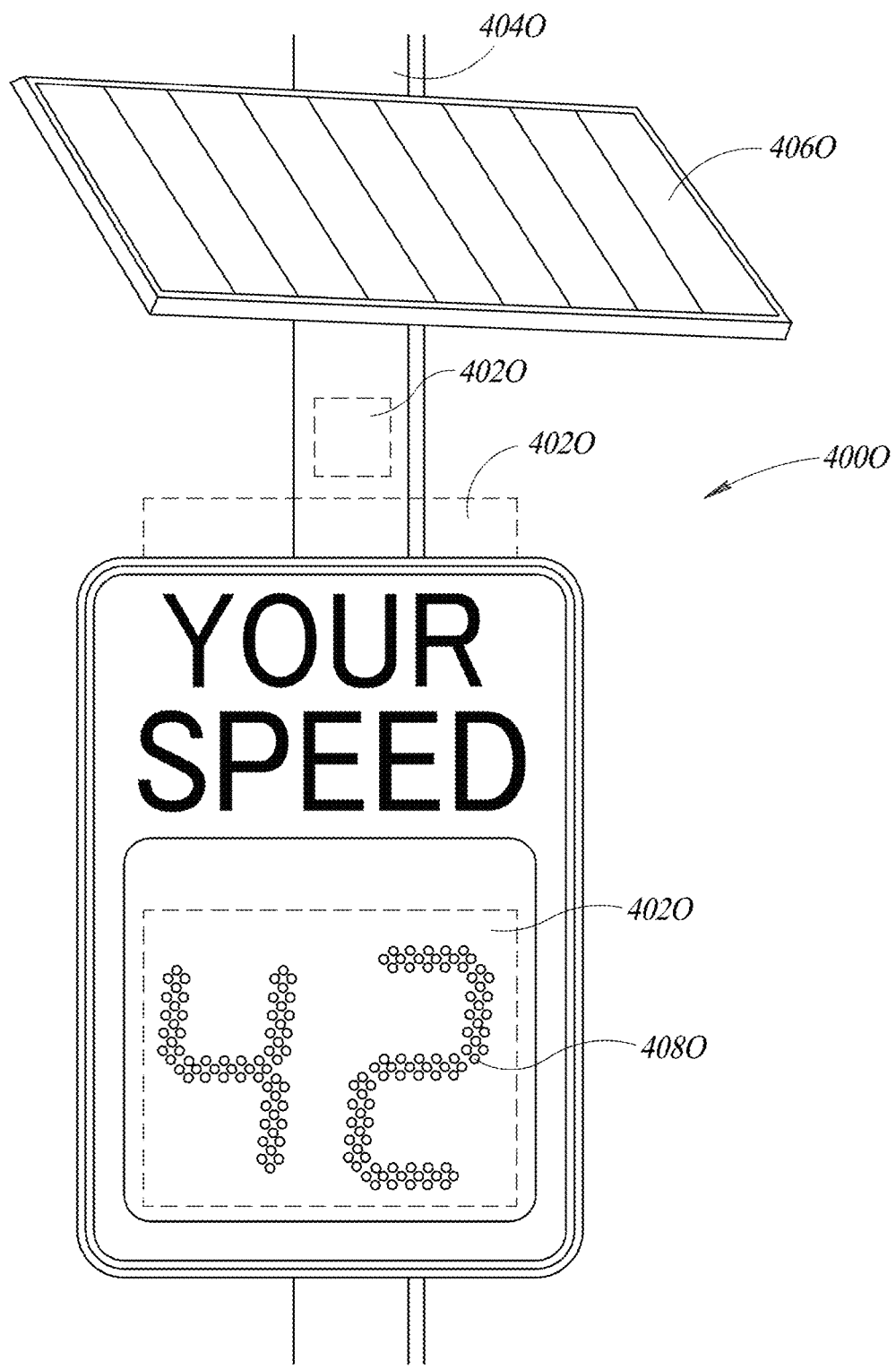
Figure 4P:
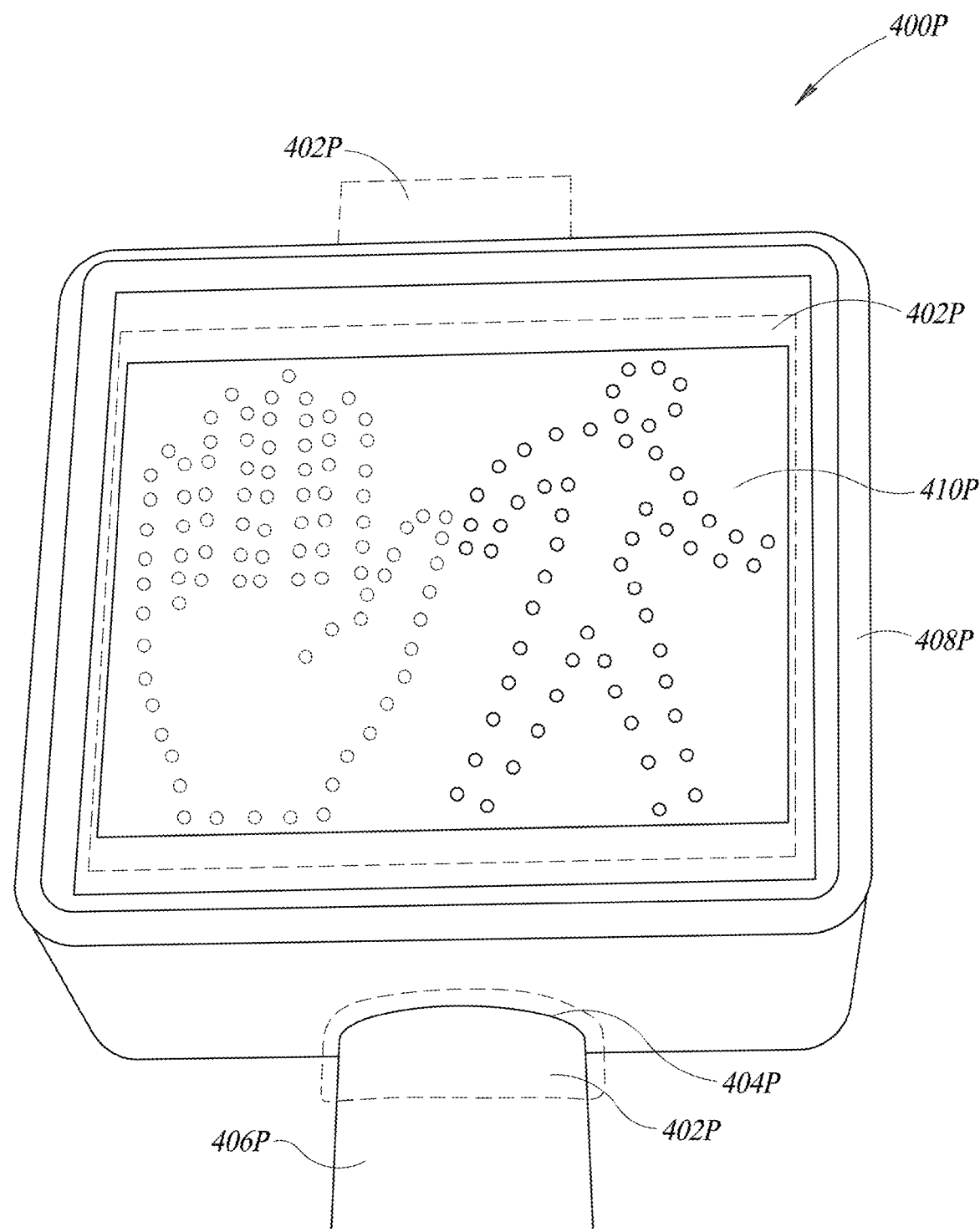
Figure 4Q:
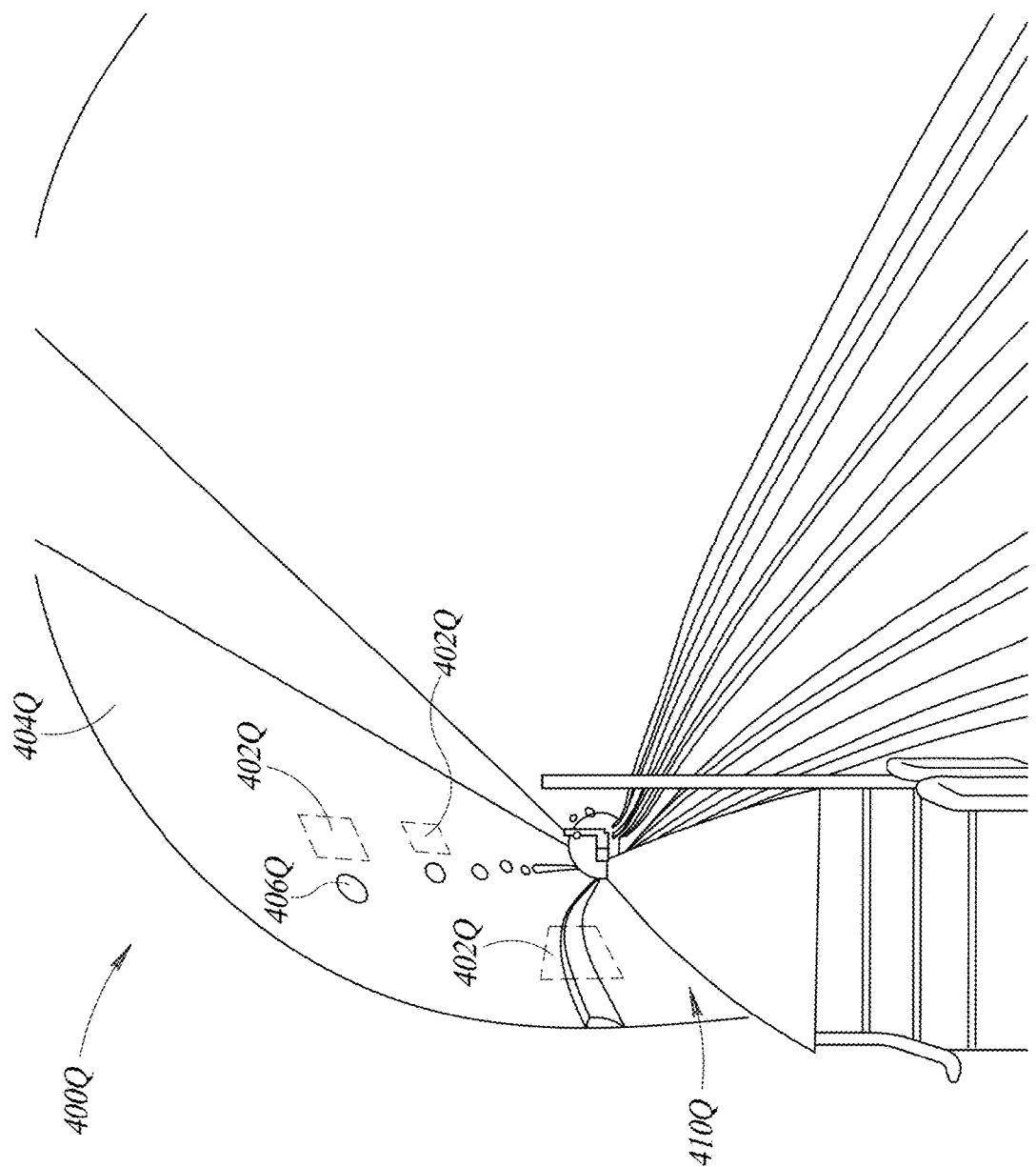
Figure 4R:
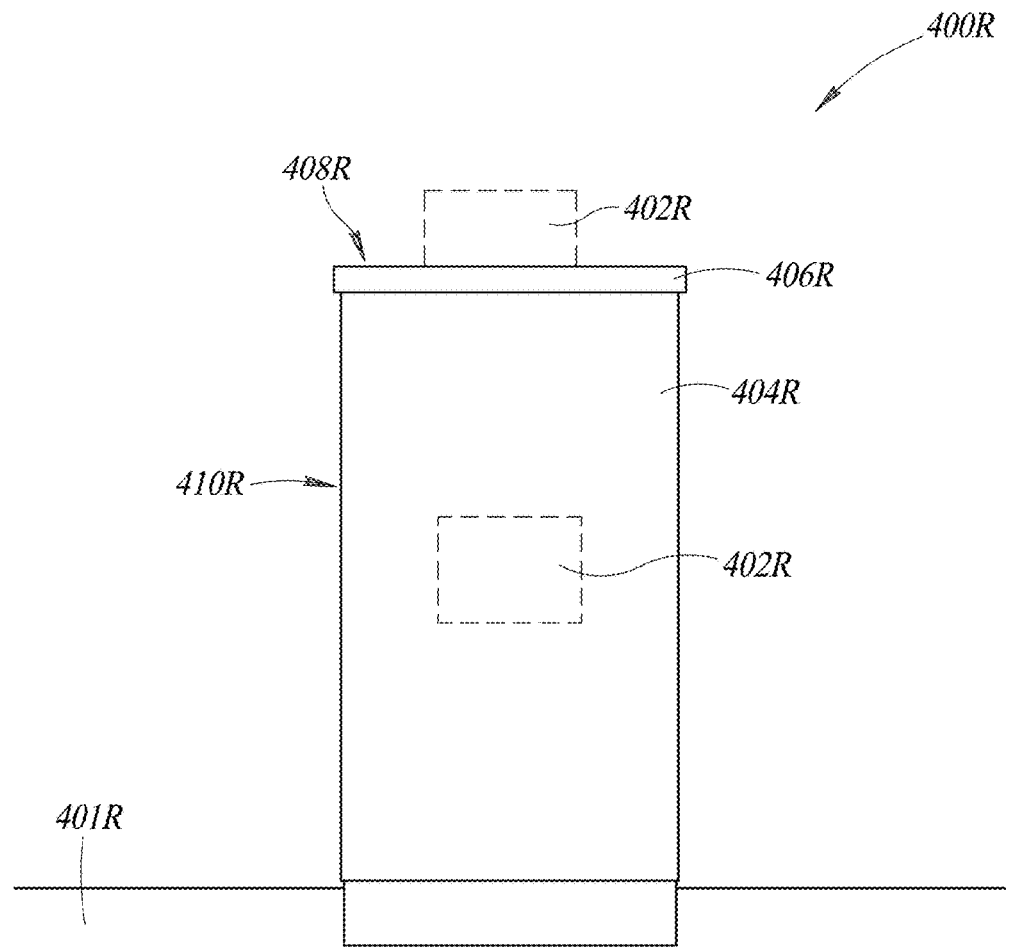
Figure 4S:
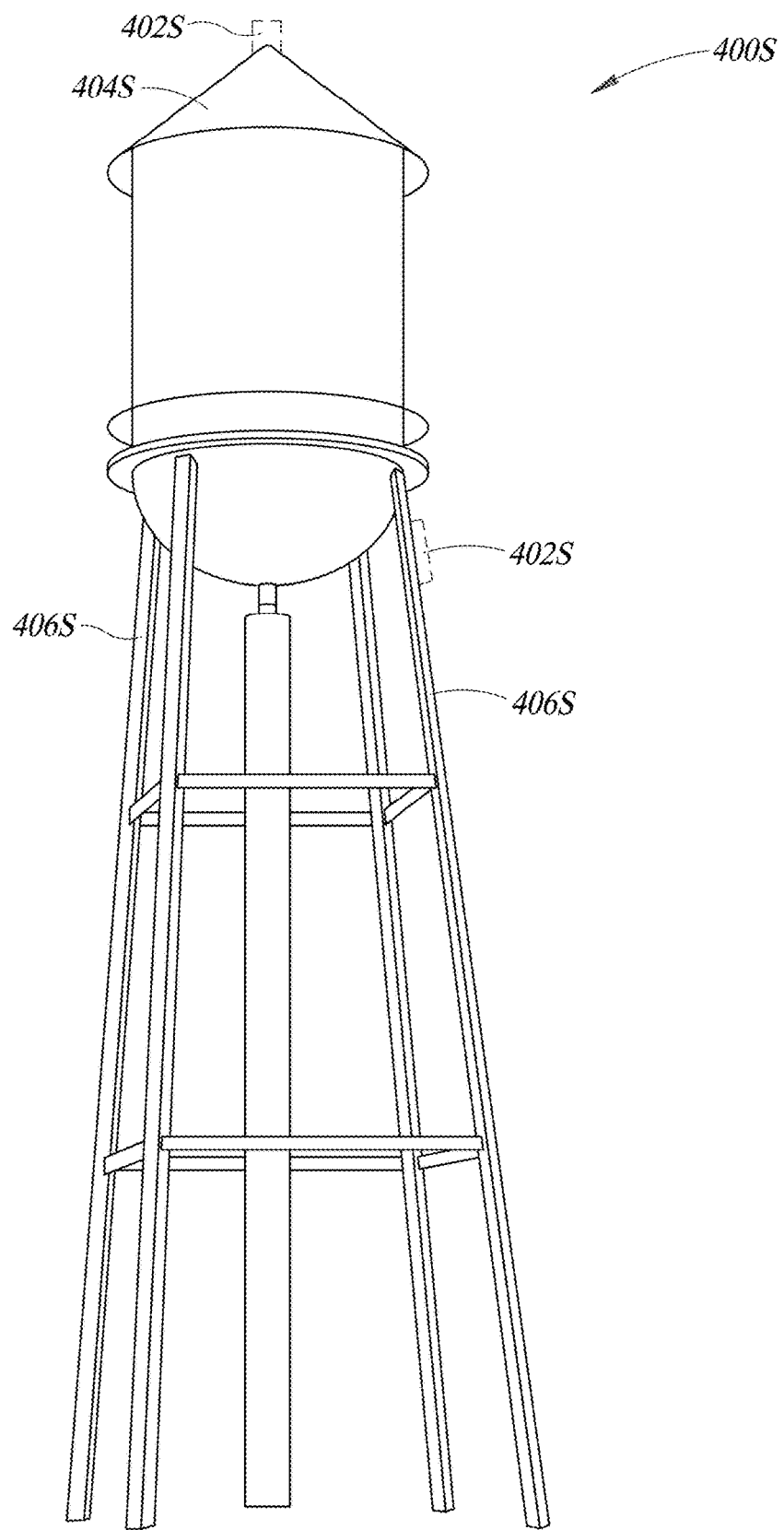
Figure 4T:
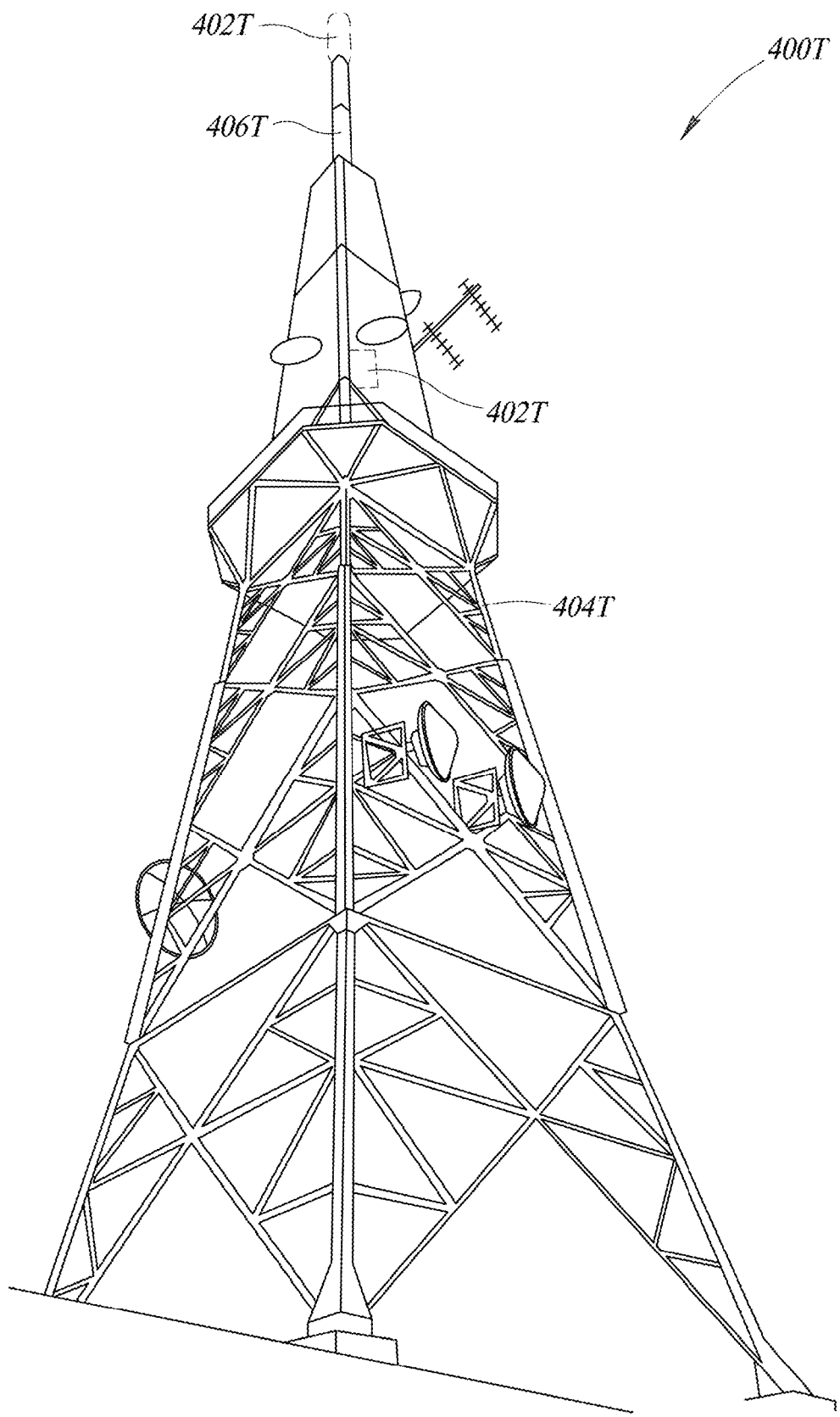
Figure 4U:
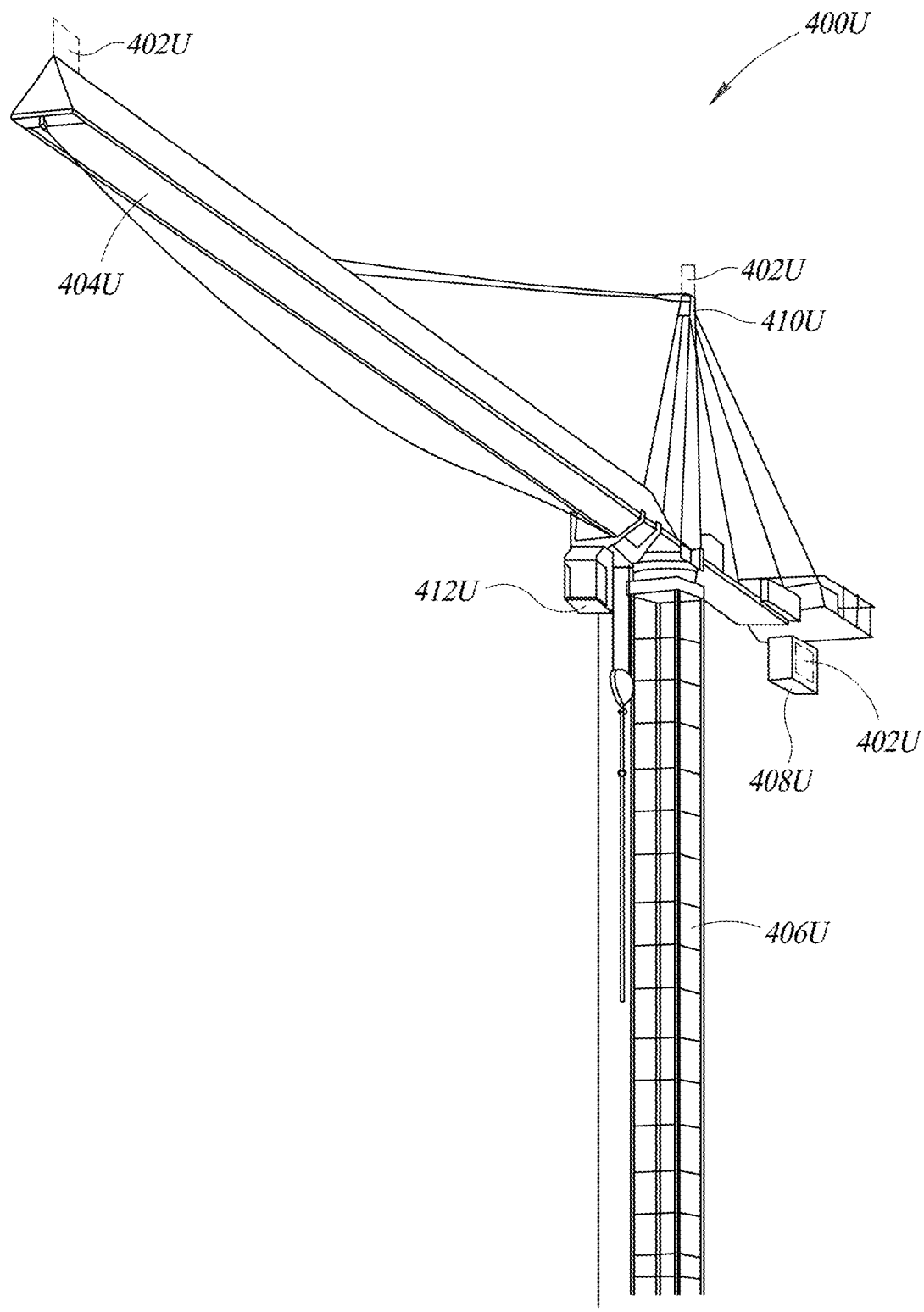
Figure 4V:
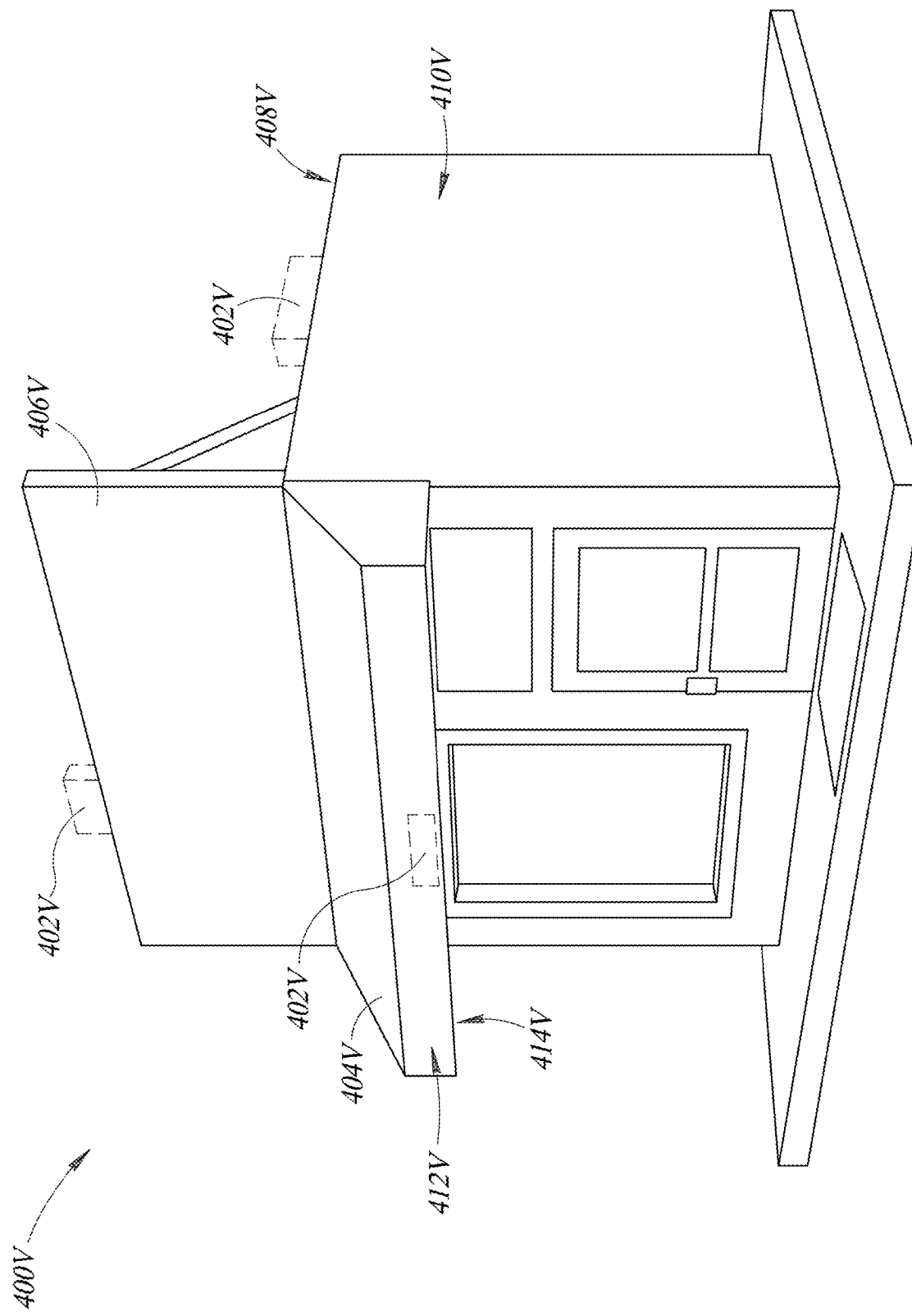
Figure 4W:
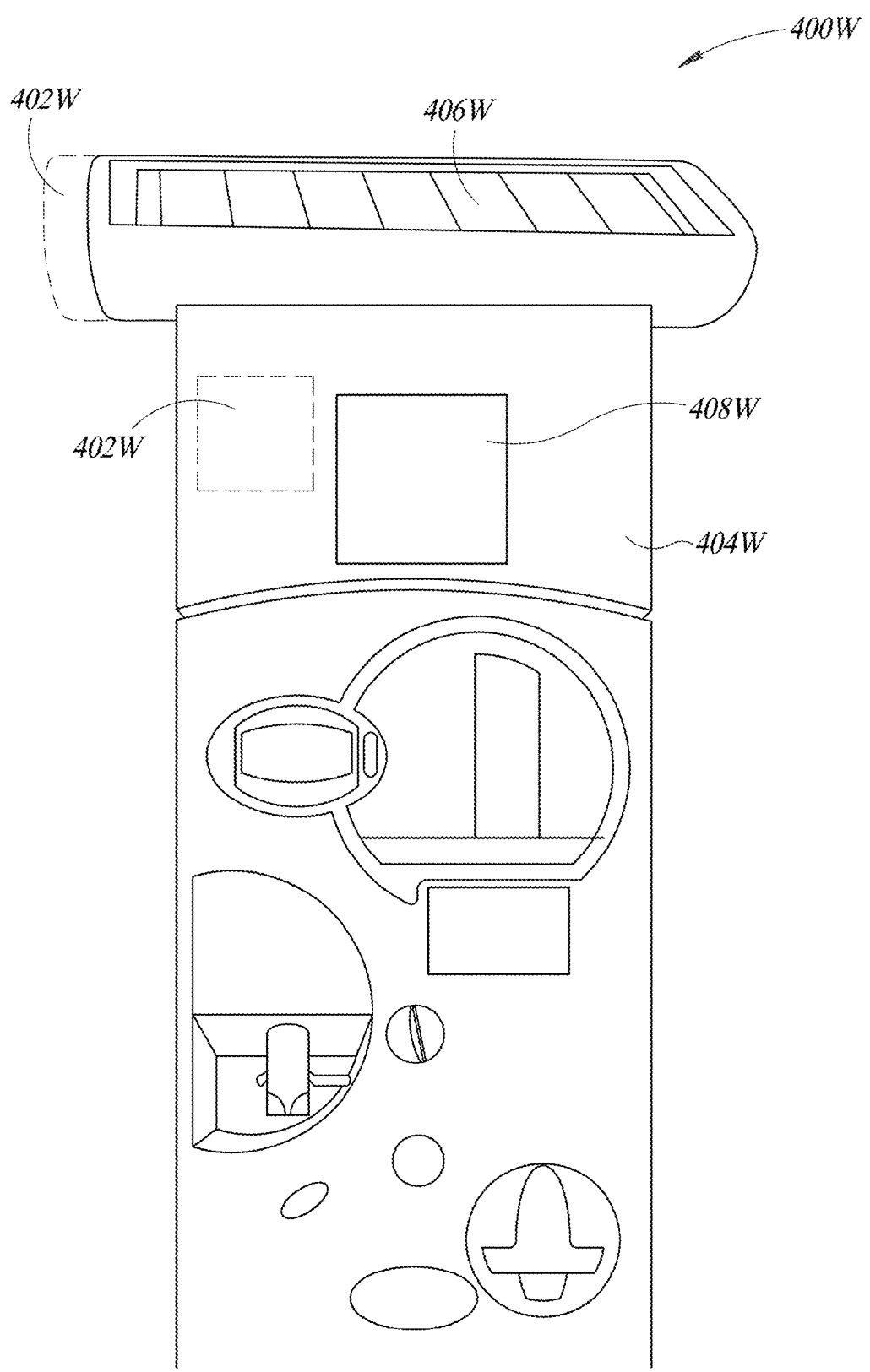

FIGS. 4A-4W illustrate the electronic components 300 described above with reference to FIG. 3A mounted to, or incorporated into, various objects commonly found in an urban or other environment where coverage by a macrocell or other telecommunications node is not available. In an embodiment, the objects described below are permanently affixed in their location, and as such, a permanently affixed object may include, without limitation, a streetlight, a light pole, an LED board, a bracket, a street sign, a highway sign, a bus stop shelter, an ATM, a phone booth, a building, an HVAC unit, a mailbox, a billboard, a light, a parking sign, a stop light, a speed limit sign, a solar cell, a crosswalk sign, a tunnel, a utility box, a water tower, a crane, a radio antenna tower, a store, an awning, a roof, and a parking pay station.

In each instance described below, unless clearly stated otherwise, a removable component (i.e., door 201 of FIG. 2A) of a permanently affixed object, such as those listed above and described below, among other permanently affixed objects in an urban or rural environment, includes a small cell networking device (i.e., small cell device 200A, 200B, or electronic components 300) integrated into the removable component, wherein the small cell networking device includes at least one, if not two, three, four, or more wireless transceiver modules within the small cell networking device that are operable to provide wireless communication capability to a wireless network controlled by a mobile network operator. In other embodiments, the small cell networking device includes some, or all, of a plurality of electronic components 300 described above with reference to FIG. 3A, including without limitation, one, two, three, four or more of any of the following: an antenna, an identity module, a GPS module, a security module, a memory, a cellular parameter module, a cellular-based gateway, an input module, an output module, a wired transceiver module, and a light sensor module. In this way, widespread installation of small cell networking device embodiments incorporating the electronic components 300 are enabled in areas with high population density or other sources of interference (i.e., cities, towns, municipalities, etc.). In the present disclosure, FIGS. 4A-4W may be collectively referred to as FIG. 4.

In the following description, small cell devices are described with reference to dashed or broken lines. It is to be appreciated that this is an indication that the small cell devices, including electronic components such as electronic components 300, can be incorporated into any number of different housings having different shapes, orientations, and configurations. As such, the shape, orientation, position, or configuration of the housing including the small cell device does not limit the present disclosure. Moreover, although the following description describes embodiments wherein a single small cell device is incorporated into various objects, it is to be appreciated that any number of small cell devices can be incorporated into or mounted to each object and that only a single small cell device is used as a non-limiting, non-exclusive example in the interest of efficiency and to avoid obscuring details of the representative embodiments. For example, in various embodiments, there are two, three, four, five, six, seven, eight, nine, ten, or more small cell devices coupled to each object described below with reference to FIGS. 4A-4W. Moreover, each small cell device referenced below may be electrically and communicatively coupled to one or more utility lines, such as power lines or telephone lines, in order to pass power or data, respectively, as described herein.

FIG. 4A illustrates a light pole 400A having a base 406A coupled to a support or pole 404A and a light source 410A coupled to and extending from the pole 404A. At a top of the light source 410A is a cap 412A. In an embodiment, electronic components, which may be along the lines of electronic components 300, form a small cell device 402A that is incorporated into light pole 400A at various locations. For example, in various embodiments, the small cell device 402A is located in the base 406A, along the pole 404A (including proximate the light source 410A as shown), or within the cap 412A. Further, it is to be appreciated that while it is preferable that the small cell device 402A is housed within the various components of the light pole 400A, that the small cell device 402A may also be housed in an external housing that is coupled to any of the features of the light pole 400A. The small cell device 402A may be coupled to and extending from the cap 412A, in one non-limiting example.

Moreover, in some cases, one or more external antennas may be electrically and communicatively coupled to the small cell device 402A and integrated into, or mounted onto, various features of the light pole 400A. For example, in an embodiment, the small cell device 402A is located in the base 406A, and an antenna is coupled to the small cell device 402A and located on an arm 408A of the light pole 400A, or within or on the cap 412A. In such cases, one or more wires may extend through the light pole 400A, including the base 406A and the pole 404A, to communicatively and electrically coupled the small cell device 402A and the one or more antennas.

FIG. 4B illustrates an alternative embodiment of a street light 400B. The street light 400B includes a pole 404B coupled and attached to a light source 410B. In certain embodiments, the street light 400B includes an advertising board or LED light board 406B coupled to and extending from the pole 404B. In such cases, the LED light board 406B, which may be used for advertisements, vehicle or pedestrian traffic control, or some other purpose, is coupled to the pole 404B with a first bracket 408B and a second bracket 410B. As such, electronic components, which may be similar to electronic components 300, comprising a small cell device 402B may be incorporated into, or mounted to, various features of the street light 400B. For example, in various embodiments, the small cell device 402B may be incorporated into or mounted to one or more of the first and second brackets 408B, 410B, the LED light board 406B, the pole 404B, or the light source 412B, as shown.

FIG. 4C illustrates an embodiment of a street sign 400C having a pole 404C coupled to signs 406C. Electronic components, which may be along the lines of electronic components 300, form a small cell device 402C that is incorporated into street sign 400C at various locations. For example, in various embodiments, the small cell device 402C is incorporated into or mounted to the pole 402C, or one or both of the signs 406C. Further, it is to be appreciated that because the small cell device 402C may be incorporated into a housing having various shapes, sizes, and orientations, the placement of the small cell device 402C within the pole 402C, for example, is not limiting. As shown, the small cell device 402C is incorporated into or mounted to the pole 402C at the base 408C (in which case one or more antennas may be coupled to an upper portion of the pole 404C) or a top 410C of the pole 404C. However, the small cell device 404C may be located anywhere along the pole 404C.

FIG. 4D is an embodiment of a bus stop shelter 400D. It is to be appreciated that the bus stop shelter 400D includes a light. In addition, or in the alternative, the bus stop shelter is otherwise located proximate utility lines so as to facilitate the electronic and communicative couplings of small cell devices 402D, as described herein. Alternatively, the small cell devices 402D may include a solar array or solar panel, in which case, the small cell devices 402D may harvest sufficient energy from the sun to generate and store adequate amounts of power to maintain constant or on-demand operation. In such cases, it is preferable that at least some portions of the small cell devices are located externally with respect to the bus stop shelter 400D so as to receive sunlight.

The bus stop shelter 400D includes a plurality of supports 412D physically and securely coupled to a roof 404D having a first or outer surface 406D, a second or inner surface 408D, and a third or side surface 410D. Electronic components, which may be along the lines of electronic components 300, form a small cell device 402D that is incorporated into bus stop shelter 400D at various locations. For example, in various embodiments, the small cell device 402D is incorporated into or mounted to the first surface 406D, the second surface 408D, or the third surface 410D. It is to be appreciated that the small cell device 402D may also be integrated into or mounted to one or more of the plurality of supports 412D.

FIG. 4E is an embodiment of an automated teller machine ("ATM") 400E. In an embodiment, electronic components, which may be along the lines of electronic components 300, form a small cell device 402E that is mounted to, or incorporated into, the ATM 400E. For example, in an embodiment, the small cell device 402E is mounted to a first or top surface 404E of the ATM 400E. However, it is to be appreciated that the small cell device 400E may also be integrated internally into the ATM 400E, such as within any portion of a body 406E of the ATM 400E, for example.

FIG. 4F is an embodiment of a personal privacy station 400F, such as a phone booth, having a shelter 404F with a first or top surface 406F and a pole 408F proximate the shelter 404F or extending from the shelter 404F. In one embodiment the pole 408F is a telephone pole, while in other embodiments, the pole 408F includes a light source, as described herein. Electronic components, which may be along the lines of electronic components 300, form a small cell device 402F that is incorporated into or mounted to personal privacy station 400F at various locations. For example, as illustrated in FIG. 4F, the small cell device 402F is mounted to the first surface 406F of the shelter 404F. In alternative embodiments, the small cell device 402F is incorporated into or mounted to various locations within the pole 408F.

FIG. 4G is an embodiment of a building 400G having a roof 404G. One or more structures 406G may be positioned on the roof 404G. The one or more structures 406G may be a heating, ventilation, and air conditioning ("HVAC") unit, a fan unit, a utility closet, a radio antenna tower, a lightning rod, an exhaust stack, or other similar structures. In an embodiment, electronic components, which may be along the lines of electronic components 300, form a small cell device 402G that is incorporated into or mounted to the roof 404G or the one or more structures 406G. For example, in one embodiment, the small cell device 402G is mounted directly to the roof 404G, while in other embodiments, the small cell device 402G is incorporated into (i.e., housed within) or mounted to the one or more structures 406G.

FIG. 4H is an embodiment of a mailbox 400H, which may be located outside, within an apartment building, or at a post office, for example. The mailbox 400H includes a first or side surface 404H, a second or rear surface 405H, and a third or top surface 406H. Moreover, in an embodiment, the mailbox 400H includes a light 407H having a support 408H and a light source housing 410H. Electronic components, which may be along the lines of electronic components 300, form a small cell device 402H that is incorporated into the mailbox 400H at various locations. For example, in various embodiments, the small cell device 402H is incorporated into or mounted to one or more of the first, second, or third surface 404H, 405H, 406H. Alternatively, the small cell device 402H may be incorporated into or mounted to the light 407H, including the support 408H, and the light source housing 410H, similar to small cell device 200 described above with reference to FIG. 2.

FIG. 4I is an embodiment of a billboard 400I having a support 404I, a display 406I, and one or more lights 408I, with the display 406I bounded by an outer edge 414I. Each light 408I includes a light source housing 410I and a cap 412I. In an embodiment, electronic components, which may be along the lines of electronic components 300, comprise a small cell device 402I that is incorporated into billboard 400I at various locations. For example, in various embodiments, the small cell device 402I is incorporated into or mounted to the support 404I, the one or more lights 408I, display 406I, or the outer edge 414I. In cases where the small cell device 400I is incorporated into or mounted to the one or more lights 408I, the small cell device 400I may be incorporated into or mounted to the light source housing 410I or the cap 412I.

FIG. 4J is an embodiment of a highway sign 400J having one or more supports 404J, a sign 406J, and an LED board 408J. In an embodiment, electronic components, which may be along the lines of electronic components 300, form a small cell device 402J that is incorporated into the highway sign 400J at various locations. For example, in various embodiments, the small cell device 402J may be integrated into or mounted to the one or more supports 404J, the sign 406J, or the LED board 408J.

FIG. 4K is an embodiment of a parking sign 400K having an LED board 404K and, and optionally, a sign 406K. In an embodiment, electronic components, which may be along the lines of electronic components 300, form a small cell device 402K that is incorporated into parking sign 400K at various locations. For example, in various embodiments, the small cell device 402K is integrated into or mounted to the sign 406K or the LED board 404K. Further, FIG. 4K illustrates a cable or wire 408K electrically coupled to and extending from the LED board 404K. As described herein, the cable or wire 408K may be electrically and communicatively coupled to the small cell device 402K to pass power or data, for example, to or from or to and from the small cell device 402K to various external sources, such as utility lines, servers, power lines, or telephone lines, for example.

FIG. 4L is an alternative exemplary embodiment of a parking sign 400L that is located on or proximate to street or ground level, as compared to parking sign 400K, which is positioned on a side of a building or above a garage opening. Parking sign 400L includes supports 404L and a board 408L coupled between the supports 404L. In many cases, but not necessarily, the parking sign 400L includes one or more LED elements 410L for indicating an available number of parking spaces, for example. In an embodiment, electronic components, which may be along the lines of electronic components 300, form a small cell device 402L that is incorporated into parking sign 400L at various locations. For example, in various embodiments, the small cell device 402L is integrated into or mounted to the supports 404L, the board 408L, or a first or top surface 406L of the board 404L.

FIG. 4M is an alternative exemplary embodiment of a highway sign 400M having supports 404M, one or more signs 406M, and an optional utility box 410M. In an embodiment, electronic components, which may be along the lines of electronic components 300, form a small cell device 402M that is incorporated into highway sign 400M at various locations. For example, in various embodiments, the small cell device 402M is mounted to a top surface 408M of the one or more signs 406M or is mounted between the one or more signs 406M. Further, it is to be appreciated that the small cell device 402M may be integrated into or mounted to the utility box 410M, in which case, one or more antennas may be integrated into or mounted to the signs 406M or the supports 404M, wherein such one or more antennas are electrically and communicatively coupled to the small cell device 402M in or on the utility box 410M.

FIG. 4N is an embodiment of a traffic control signal (e.g., a stop light) 400N having a housing 404N, a cap 406N physically coupled to or integrated into the housing 404N, and a plurality of light source housings 410N, each including a respective one of a plurality of light sources 408N. It is to be appreciated that each of the plurality of light sources 408N may be an incandescent light source or an LED light source, or others, as described herein. Further, it is common to update the traffic control signal 400N by removing incandescent light sources and replacing them with more energy efficient LED light sources. In such cases, considerable space is left within the housing 404N. As such, one or more modified components may be manufactured to be incorporated into stop light 400N. For example, the cap 406N, or one or more of the plurality of light source housings 410N, may be removed and modified to include electronic components, which may be along the lines of electronic components 300, comprising a small cell device 402N. Then, the modified component including 402N may be installed into the traffic control signal 400N in a similar manner as described above with reference to FIG. 2. The additional internal electronics occupy the space created by removal of larger, older, electronics, such as incandescent light sources. However, because the small cell device 402N can be manufactured to be a comparatively small device in its own right, it is possible to incorporate the small cell device 402N in a similar manner even without removing and replacing other electronic components.

Additionally or alternatively, the small cell device 402N may be incorporated into or otherwise mounted to the traffic control signal 400N in various locations. For example, in various embodiments, the small cell device 402N is integrated into or mounted to the housing 404N, any one or all of the plurality of light source housings 410N, or the cap 406N.

FIG. 4O is an embodiment of a vehicular traffic control signal (e.g., a speed limit sign) 400O securely physically coupled to a support pole 404O and having an LED display board 408O. A solar array or panel 406O is securely physically coupled to the support pole 404O and is electrically coupled to the LED board 408O so as to provide power to the LED board 408O. In an embodiment, electronic components, which may be along the lines of electronic components 300, form a small cell device 402O that is incorporated into or mounted to vehicular traffic control signal 400O at various locations. For example, in various embodiments, the small cell device 402O is incorporated into or mounted to the LED board 408O, the support pole 404O, or the solar panel 406O. As such, FIG. 4O illustrates an embodiment where the small cell device 402O can be electrically coupled to an external solar panel 406O so as to provide power for operation of the small cell device 402O without connecting the small cell device 402O to a city's power grid. This arrangement is particularly advantageous in situations where the nearest utility line or power source is not located proximate to the small cell device 402O.

FIG. 4P is an embodiment of a pedestrian traffic control signal (e.g., a crosswalk sign) 400P having a support 406P and a housing 408P. Mounted in and to the housing 408P is a LED board 410P. In an embodiment, electronic components, which may be along the lines of electronic components 300, form a small cell device 402P that is incorporated into pedestrian traffic control signal 400P at various locations. For example, in various embodiments, the small cell device 400P is incorporated into or mounted to the LED board 410P, the housing 408P, the support 406P, or at a base 404P of the housing 408P adjacent where the support 406P couples to the housing 408P. In such cases where the small cell device 402P is mounted at the base 404P of the housing 408P, the small cell device 402P may take the form of a collar with a cavity through a center thereof that wraps around and clamps to the support 406P.

FIG. 4Q is an embodiment of a subway, train, or bus tunnel 400Q having cylindrical walls 404Q and a plurality of lights 406Q integrated into or mounted to the walls 404Q. In an embodiment, electronic components, which may be along the lines of electronic components 300, form a small cell device 402Q that is incorporated into tunnel 400Q at various locations. For example, in various embodiments, the small cell device 402Q is mounted to the walls 404Q of the tunnel or integrated into the light housings for each light 406Q. Alternatively or additionally, the small cell device 402Q may be integrated into or mounted to a utility box positioned along a utility or maintenance access way 410Q in the tunnel 400Q.

FIG. 4R is an embodiment of a utility box 400R mounted to a surface 401R, which may be a street, sidewalk, or rooftop, for example. The utility box 400R includes a first or top surface 408R and a second or side surface 410R, as well as a roof 406R coupled to a housing 404R. In an embodiment, electronic components, which may be along the lines of electronic components 300, form a small cell device 402R that is incorporated into utility box 400R at various locations. For example, in various embodiments, the small cell device 400R is incorporated into or mounted to the housing 404R, the roof 406R, the first surface 408R, or the second surface 410R.

FIG. 4S is an embodiment of a water tower 400S having a tank 404S supported by a plurality of supports 406S securely physically coupled to the tank 404S. In an embodiment, electronic components, which may be along the lines of electronic components 300, form a small cell device 402S that is incorporated into or mounted to water tank 400S at various locations. For example, in various embodiments, the small cell device 402S is incorporated into or mounted to any one or more of the plurality of supports 406S at any position along their length, or the tank 404S, including at a top of the tank, as illustrated. In this particular embodiment, the small cell device 402S may benefit from drawing power from one or more solar arrays or panels if there are no utility lines near the water tower 400S.

FIG. 4T is an embodiment of a radio tower 400T comprised of a plurality of supports 404T and a rod 406T extending from an upper portion of the radio tower 400T. In an embodiment, electronic components, which may be along the lines of electronic components 300, form a small cell device 402T that is incorporated into radio tower 400T at various locations. For example, in various embodiments, the small cell device 400T is integrated into or mounted to any one of the plurality of supports 404T at any location along a height of the radio tower 400T, or to the rod 406T extending from the upper portion of the radio tower 400T.

FIG. 4U is an embodiment of construction equipment, in this case a crane 400U, including a base 406U supporting a boom 404U, with a mast 410U extending from and coupled to the base 406U to further support the boom 404U. Other types of construction, industrial, and generally large, stable pieces of equipment are also contemplated. The crane 400U further includes a counterweight 408U and an operator's booth 412U. In an embodiment, electronic components, which may be along the lines of electronic components 300, form a small cell device 402U that is incorporated into crane 400U at various locations. For example, in various embodiments, the small cell device 402U is incorporated into or mounted to the base 406U, the boom 404U, the counterweight 408U, the mast 410U, or the operator's booth 412U.

FIG. 4V shows an embodiment of a store 400V having a roof 408V and sidewalls 410V, an awning 404V coupled to one and extending from one of the sidewalls 410V and a sign 406V coupled to and extending from the roof 408V. The awning 404V includes an outer surface 412V and an inner surface 414V. In an embodiment, electronic components, which may be along the lines of electronic components 300, form a small cell device 402V that is incorporated into or mounted to the store 400V at various locations. For example, in various embodiments, the small cell device 400V is mounted to one or more of the sidewalls 410V or the roof 408V. Alternatively or additionally, the small cell device 400V may be mounted to the 404V, including on the outer surface 412V or the inner surface 414V. In further cases, the small cell device 402V may be mounted to or integrated into the sign 406V extending from the roof 408V.

FIG. 4W is an embodiment of a kiosk (e.g., a parking pay station) 400W having a base or housing 404W and a solar cell 406W mounted to and extending from the base 404W. Various electronic and manual components, such as screen 408W, are housed within the base 404W and powered by the solar cell 406W. In an embodiment, electronic components, which may be along the lines of electronic components 300, form a small cell device 402W that is incorporated into the kiosk 400W at various locations. For example, in various embodiments, the small cell device 402W is incorporated into or mounted to the base 404W. In an alternative embodiment, the small cell device 402W is mounted to or incorporated into the screen 408W. In yet further embodiments, the small cell device 402W is mounted to or incorporated into the solar cell 406W.

Further, it is to be appreciated that the present disclosure includes methods for installing small cell devices into or onto the various objects discussed herein. For example, a method may include removing a component of an object (wherein the object is any one of the objects discussed herein or similar objects), modifying the object to form a modified component, wherein the modified component includes some or all of the electronic components 300 with the electronic components 300 forming a small cell device. Then, the modified component including the small cell device is installed into the object in place of the original component, and wires or cables are electrically or communicatively coupled between the small cell device and one or more of utility lines, power sources (including a solar cell or solar panel), power lines, or others.

Alternatively, the method may simply include forming the small cell, the forming including providing the electronic components 300 in a housing suitable to be attached to any of the objects describe herein and other like objects, installing the small cell device, and connecting the small cell device to a power source or other utility line to pass power and data via one or more wires or cables.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a small cell networking device may be described as being mounted "substantially horizontal," In these cases, a device that is mounted exactly horizontal is mounted along an "X" axis and a "Y" axis that is normal (i.e., 90 degrees or at right angle) to a plane or line formed by a "Z" axis. Different from the exact precision of the term, "horizontal," and the use of "substantially" or "about" to modify the characteristic permits a variance of the particular characteristic by up to 30 percent. As another example, a small cell networking device having a particular linear dimension of between about six (6) inches and twelve (12) inches includes such devices in which the linear dimension varies by up to 30 percent. Accordingly, the particular linear dimension of the small cell networking device may be between 2.4 inches and 15.6 inches.

The terms "include" and "comprise" as well as derivatives thereof, in all of their syntactic contexts, are to be construed without limitation in an open, inclusive sense (e.g., "including, but not limited to"). The term "or," is inclusive, meaning "and/or." The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense (e.g., "including, but not limited to").

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity, as the case may be. In addition, the composition of "and" and "or" when recited herein as "and/or" is intended to encompass an embodiment that includes all of the associated items or ideas and one or more other alternative embodiments that include fewer than all of the associated items or ideas.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

When so arranged as described herein, each computing device may be transformed from a generic and unspecific computing device to a combination device comprising hardware and software configured for a specific and particular purpose. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A small cell device comprising:
   a housing body defining a cavity and having a first end and a second end separated by a depth of the housing body;
   a heat sink coupled to the housing body proximate the first end thereof;
   an interface board positioned within the cavity of the housing body adjacent to the heat sink;
   a first power amplifier board positioned within the cavity of the housing body adjacent to the interface board and the heat sink;
   a second power amplifier board positioned within the cavity of the housing body proximate the second end thereof;
   a power board positioned within the cavity of the housing body adjacent to the second power amplifier board; and
   a main board positioned within the cavity of the housing body between the interface board and the second power amplifier board;
   wherein the heat sink is arranged to dissipate heat generated during operation of at least the first power amplifier board.

2. The small cell device of claim 1, further comprising:
   a second heat sink coupled to the housing body proximate the second end thereof and positioned adjacent to the second power amplifier board.

3. The small cell device of claim 2, further comprising:
   an antenna board positioned proximate the second end of the housing body adjacent to the second heat sink.

4. The small cell device of claim 3, further comprising:
   an antenna cover coupled to the second end of the housing body and enclosing at least the antenna board.

5. The small cell device of claim 4, wherein a lengthwise end of the housing body includes a tab curved toward the heat sink.

6. The small cell device of claim 1, wherein a lengthwise end of the housing body includes a tab curved toward the heat sink.

7. The small cell device of claim 6, wherein a second lengthwise end of the housing body includes a hinge.

8. The small cell device of claim 5, wherein a second lengthwise end of the housing body includes a hinge.

9. The small cell device of claim 2, wherein a lengthwise end of the housing body includes a tab curved toward the heat sink.

10. The small cell device of claim 9, wherein a second lengthwise end of the housing body includes a hinge.

11. The small cell device of claim 3, wherein a lengthwise end of the housing body includes a tab curved toward the heat sink.

12. The small cell device of claim 11, wherein a second lengthwise end of the housing body includes a hinge.

\* \* \* \* \*